(12) United States Patent
Koo et al.

(10) Patent No.: US 11,166,045 B2
(45) Date of Patent: Nov. 2, 2021

(54) METHOD FOR IMAGE CODING ON BASIS OF SEPARABLE TRANSFORM AND APPARATUS THEREFOR

(71) Applicant: LG ELECTRONICS INC., Seoul (KR)

(72) Inventors: Moonmo Koo, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/652,952

(22) PCT Filed: Oct. 11, 2018

(86) PCT No.: PCT/KR2018/011952
§ 371 (c)(1),
(2) Date: Apr. 1, 2020

(87) PCT Pub. No.: WO2019/074291
PCT Pub. Date: Apr. 18, 2019

(65) Prior Publication Data
US 2020/0322635 A1    Oct. 8, 2020

Related U.S. Application Data

(60) Provisional application No. 62/571,187, filed on Oct. 11, 2017.

(51) Int. Cl.
*H04N 19/625* (2014.01)
*H04N 19/124* (2014.01)
(Continued)

(52) U.S. Cl.
CPC ......... *H04N 19/625* (2014.11); *H04N 19/124* (2014.11); *H04N 19/129* (2014.11);
(Continued)

(58) Field of Classification Search
None
See application file for complete search history.

(56) References Cited

U.S. PATENT DOCUMENTS

2019/0052876 A1* 2/2019 Lee ............... H04N 19/159
2019/0306536 A1* 10/2019 Lim ............... H04N 19/649
2019/0313102 A1* 10/2019 Cho ............... H04N 19/91

FOREIGN PATENT DOCUMENTS

KR    10-2017-0066401 A    6/2017
WO    2017-138791 A1    8/2017

OTHER PUBLICATIONS

Algorithm description of Joint Exploration Test Model 3, Jun. 1, 2016, hereinafter Chen (Year: 2016).*

(Continued)

*Primary Examiner* — Samuel D Fereja
(74) *Attorney, Agent, or Firm* — Dentons US LLP

(57) ABSTRACT

An image decoding method according to the present invention comprises the steps of: deriving, from a bitstream, quantized transform coefficients for a block to be decoded; deriving transform coefficients through dequantization on the basis of the quantized transform coefficients for the block to be decoded; determining a transform configuration group for the block to be decoded; deriving a horizontal transform kernel and a vertical transform kernel on the basis of the transform configuration group and transform index information acquired from the bitstream; deriving residual samples by performing a separable transform on the basis of the horizontal transform kernel and the vertical transform kernel; and generating a reconstructed picture on the basis of the residual samples and prediction samples of the block to be decoded, wherein the transform configuration group includes an identity transform kernel as a candidate transform kernel for the horizontal transform kernel or the (Continued)

vertical transform kernel. According to the present invention, the efficiency of residual coding can be improved.

13 Claims, 9 Drawing Sheets

(51) Int. Cl.
*H04N 19/132* (2014.01)
*H04N 19/129* (2014.01)
*H04N 19/136* (2014.01)
*H04N 19/176* (2014.01)
*H04N 19/18* (2014.01)
*H04N 19/184* (2014.01)
*H04N 19/70* (2014.01)

(52) U.S. Cl.
CPC ......... *H04N 19/132* (2014.11); *H04N 19/136* (2014.11); *H04N 19/176* (2014.11); *H04N 19/18* (2014.11); *H04N 19/184* (2014.11); *H04N 19/70* (2014.11)

(56) References Cited

OTHER PUBLICATIONS

J. Chen et al., "Algorithm Description of Joint Exploration Test Model 3", JVET-C1001, Joint Video Exploration Team (JVET) of ITU-T SG 16 WP 3 and ISO/IEC JTC 1/SC 29/WG 11, 11th Meeting: Geneva, CH, May 26-Jun. 1, 2016.

C. Rosewarne et al., "High Efficiency Video Coding (HEVC) Test Model 16 (HM 16) Improved Encoder Description Update 9", JCTVC-AB1002, Joint Collaborative Team on Video Coding (JCT-VC) of ITU-T SG 16 WP 3 and ISO/IEC JTC1/SC 29/WG 11, 28th Meeting: Torino, IT, Jul. 15-21, 2017.

V. Lorcy et al., "EE2: Adaptive Primary Transform Improvement", JVET-D0065, Joint Exploration Team (JVET) of ITU-T SG 16 WP 3 and ISO/IEC JTC 1/SC 29/WG 11, 4th Meeting: Chengdu, CN, Oct. 15-21, 2016.

\* cited by examiner (a) Vertical scan (b) Horizontal scan

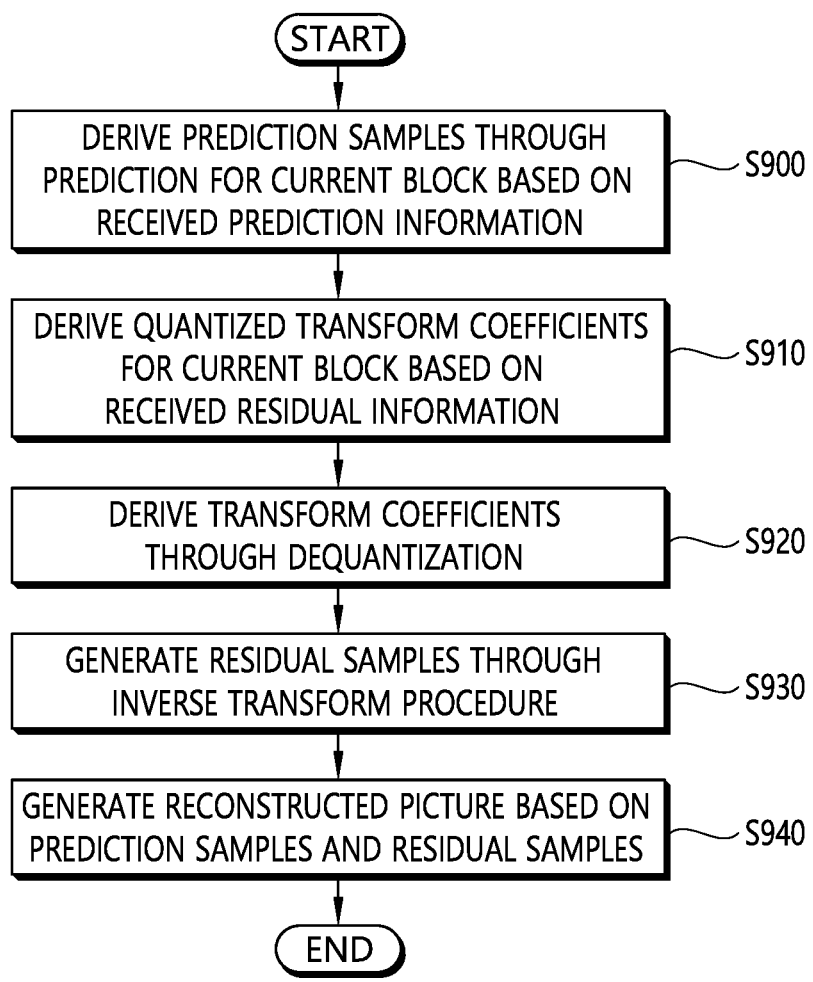

METHOD FOR IMAGE CODING ON BASIS OF SEPARABLE TRANSFORM AND APPARATUS THEREFOR

CROSS-REFERENCE TO RELATED APPLICATIONS

This application is the National Stage filing under 35 U.S.C. 371 of International Application No. PCT/KR2018/011952, filed on Oct. 11, 2018, which claims the benefit of U.S. Provisional Application No. 62/571,187 filed on Oct. 11, 2017, the contents of which are all hereby incorporated by reference herein in their entirety.

BACKGROUND OF THE DISCLOSURE

Field of the Disclosure

The present disclosure relates to an image coding technique, and more particularly, to a separable transform-based image coding and apparatus in an image coding system.

Related Art

Recently, demand for high-resolution and high-quality images such as high definition (HD) images and ultra-high definition (UHD) images has increased in various fields. As image data increasingly has higher resolution and higher quality, the amount of transmitted information or bit increases compared to the existing image data. Thus, when image data is transmitted using a medium such as the existing wired/wireless broadband line or when the image data is stored using the existing storage medium, cost for transmission and storage increases.

Therefore, a highly efficient image compression technique is required to effectively transmit, store, and reproduce high-resolution, high-quality image information.

SUMMARY

An aspect of the present disclosure provides a method and apparatus for improving image coding efficiency.

Another aspect of the present disclosure provides a method and apparatus for increasing transform efficiency.

Another aspect of the present disclosure provides a method and apparatus for increasing efficiency of residual coding through transform.

Pi Another aspect of the present disclosure provides a method and apparatus for a separable transform.

Another aspect of the present disclosure provides a method and apparatus for supporting partial transform skip in a separable transform.

In an aspect, an image decoding method performed by a decoding apparatus is provided. The method includes: deriving quantized transform coefficients for a target block from a bit stream; deriving transform coefficients through dequantization based on the quantized transform coefficients for the target block; determining a transform configuration group for the target block; deriving a horizontal transform kernel and a vertical transform kernel based on transform index information acquired from the bit stream and the transform configuration group; deriving residual samples by performing a separable transform based on the horizontal transform kernel and the vertical transform kernel; and generating a reconstructed picture based on the residual samples and prediction samples for the target block, wherein the transform configuration group includes an identity transform kernel as a transform kernel candidate for the horizontal transform kernel or the vertical transform kernel.

In another aspect, a decoding apparatus for performing image decoding is provided. The decoding apparatus includes: an entropy decoder configured to derive quantized transform coefficients for a target block from a bit stream; a dequantizer configured to derive transform coefficients through dequantization based on the quantized transform coefficients for the target block; an inverse-transformer configured to determine a transform configuration group for the target block, to derive a horizontal transform kernel and a vertical transform kernel based on transform index information acquired from the bit stream and the transform configuration group, and to derive residual samples by performing a separable transform based on the horizontal transform kernel and the vertical transform kernel; and an adder configured to generate a reconstructed picture based on the residual samples and prediction samples for the target block, wherein the transform configuration group includes an identity transform kernel as a transform kernel candidate for the horizontal transform kernel or the vertical transform kernel.

In another aspect, an image encoding method performed by an encoding apparatus is provided. The method includes: deriving residual samples for a target block; determining a transform configuration group for the target block, the transform configuration group including a plurality of vertical and horizontal transform kernel candidate sets; selecting one of the plurality of candidate sets and generating transform index information indicating the selected candidate set; deriving transform coefficients by performing a separable transform based on a horizontal transform kernel and a vertical transform kernel included in the selected candidate set; performing quantization based on the transform coefficients to derive quantized transform coefficients; generating residual information based on the quantized transform coefficients; and encoding image information including the transform index information and the residual information, wherein the transform configuration group includes an identity transform kernel as a transform kernel candidate for the horizontal transform kernel or the vertical transform kernel.

In another aspect, an encoding apparatus for performing image encoding is provided. The encoding apparatus includes: a subtractor configured to derive residual samples for a target block; a transformer configured to determine a transform configuration group for the target block, the transform configuration group including a plurality of vertical and horizontal transform kernel candidate sets, configured to select one of the plurality of candidate sets and generate transform index information indicating the selected candidate set, and configured to derive transform coefficients by performing a separable transform based on a horizontal transform kernel and a vertical transform kernel included in the selected candidate set; a quantizer configured to perform quantization based on the transform coefficients to derive quantized transform coefficients; and an entropy-encoder configured to generate residual information based on the quantized transform coefficients and encode image information including the transform index information and the residual information, wherein the transform configuration group includes an identity transform kernel as a transform kernel candidate for the horizontal transform kernel or the vertical transform kernel.

According to the present disclosure, overall image/video compression efficiency may be improved.

According to the present disclosure, the amount of transmitted data required for residual processing may be reduced through an efficient transform and residual coding efficiency may be improved.

According to the present disclosure, non-zero transform coefficients may be concentrated on a low frequency component through a secondary transform in a frequency domain.

According to the present disclosure, different transform kernels may be applied in horizontal and vertical directions when a separable transform is performed, and transform efficiency may be increased by applying transform skip to part of the horizontal and vertical directions.

BRIEF DESCRIPTION OF THE DRAWINGS

FIG. 9 schematically shows an example of a video/image decoding method according to the present disclosure.

Figure 1:
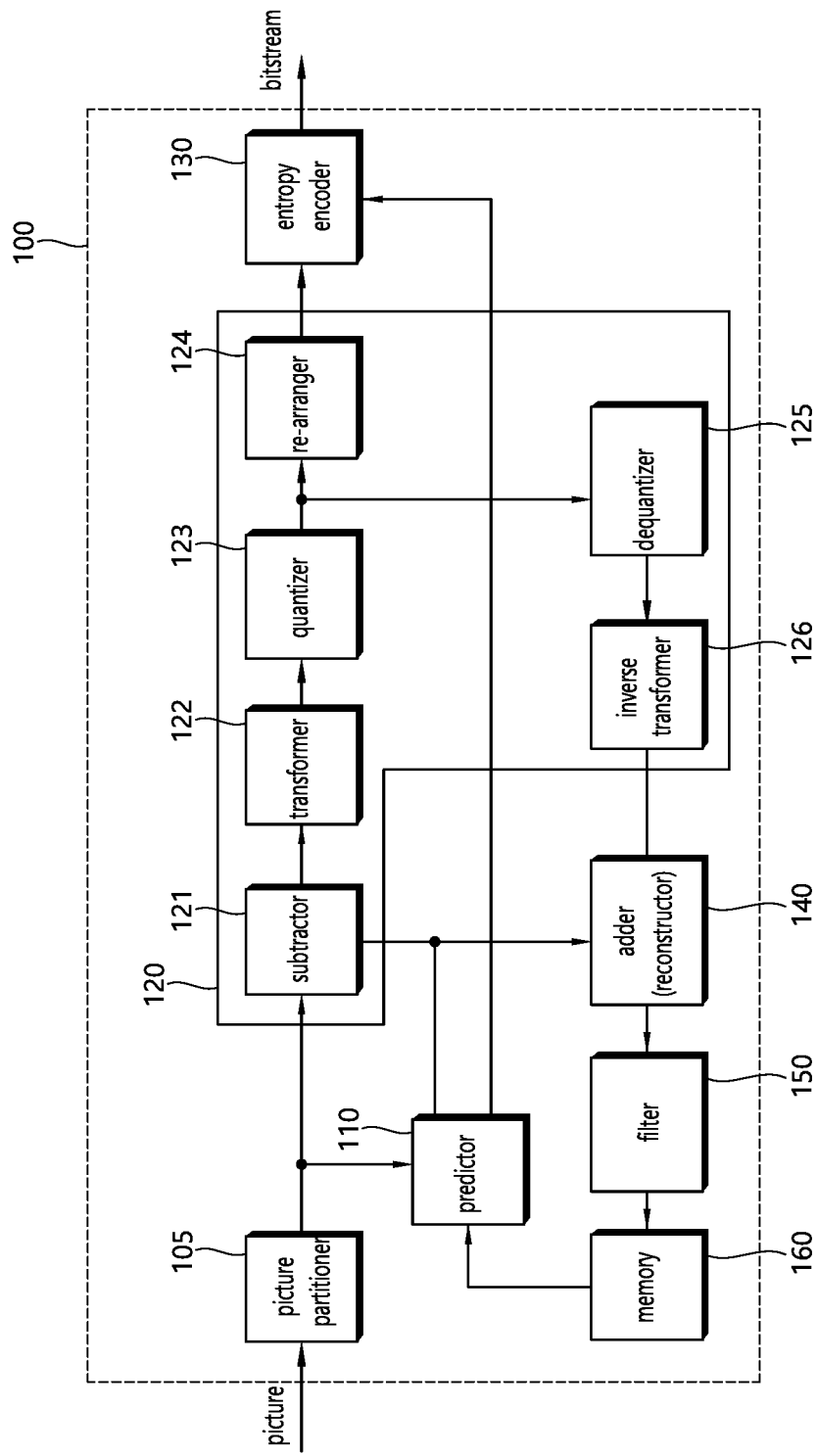
FIG. 1 is a view schematically illustrating a configuration of a video/image encoding apparatus to which the present disclosure may be applied.

DESCRIPTION OF EXEMPLARY
EMBODIMENTS

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, examples of the present embodiment will be described in detail with reference to the accompanying drawings. In addition, like reference numerals are used to indicate like elements throughout the drawings, and the same descriptions on the like elements will be omitted.

In the present disclosure, a video may mean a set of a series of images according to a passage of time. Generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific region and information related to the region. Optionally, the unit may be mixed with terms such as a block, an region, or the like. In a typical case, an M×N block may represent a set of samples or transform coefficients arranged in M columns and N rows.

FIG. 1 briefly illustrates a structure of a video/image encoding apparatus to which the present disclosure is applicable. Hereinafter, a video encoding apparatus may include an image encoding apparatus.

Referring to FIG. 1, a video encoding apparatus 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure, a binary tree structure and/or a ternary tree structure. In this case, for example, the quad tree structure may be first applied and the binary tree structure and ternary tree structure may be applied later.

Alternatively, the binary tree structure/ternary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific region in the form of a block in a picture and include an array of prediction samples. Also, the transform block or transform unit may refer to a specific region in the form of a block in a picture and include the transform coefficient or an array of residual samples.

The predictor 110 may perform prediction on a processing target block (hereinafter, may be referred to as a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding, according to an entropy encoding or according to a pred-configured method, together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
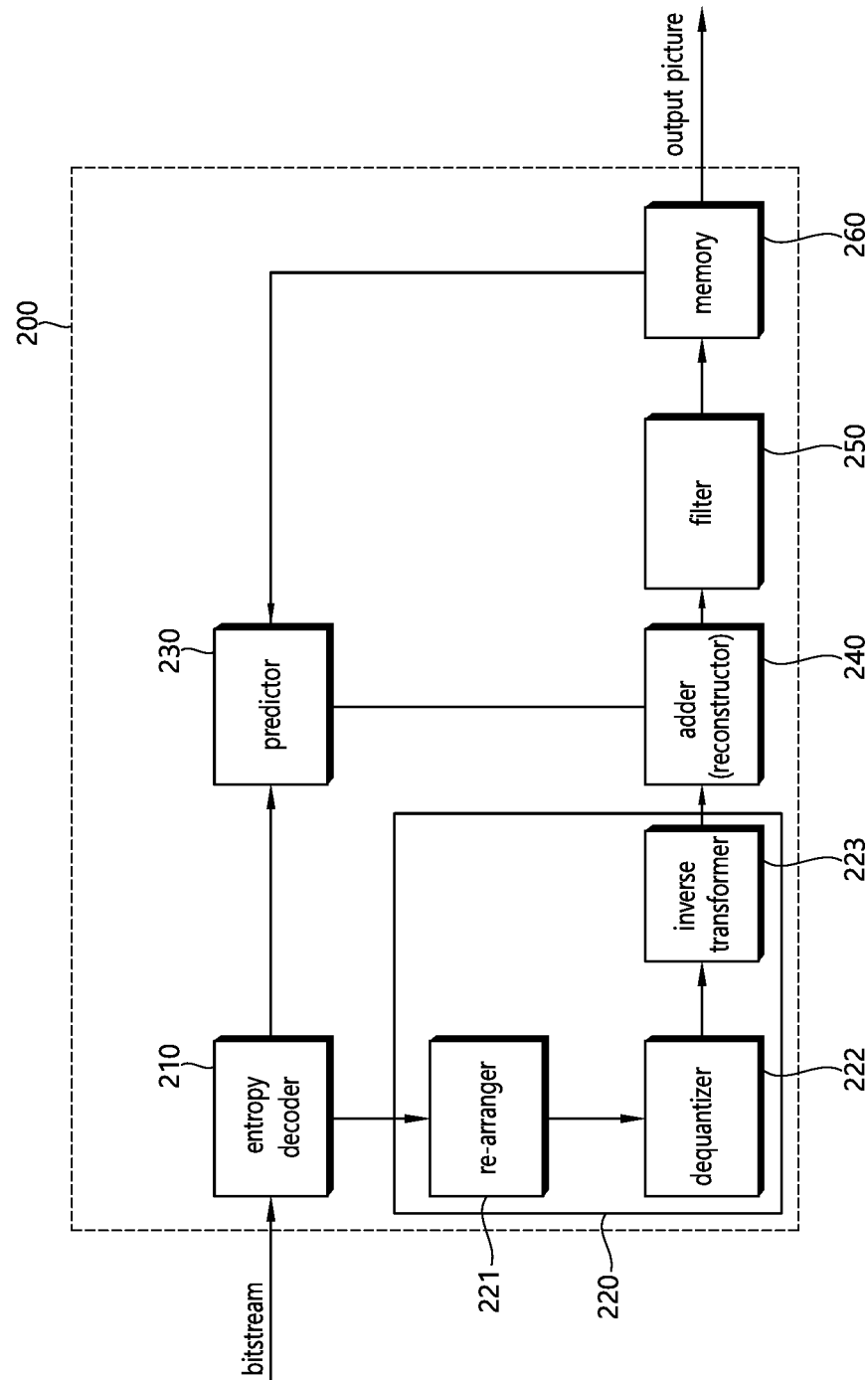
FIG. 2 is a view schematically illustrating a configuration of a video/image decoding apparatus to which the present disclosure may be applied.

FIG. 2 briefly illustrates a structure of a video decoding apparatus to which the present disclosure is applicable. Hereinafter, a video decoding apparatus may include an image decoding apparatus.

Referring to FIG. 2, a video decoding apparatus 200 may include an entropy decoder 210, a residual processor 220, a predictor 230, an adder 240, a filter 250, and a memory 260. The residual processor 220 may include a re-arranger 221, a dequantizer 222, an inverse transformer 223.

Further, although it is not depicted, the video decoding apparatus 200 may include a receiver for receiving a bitstream including video information. The receiver may be configured as a separate module or may be included in the entropy decoder 210.

When a bit stream including video/image information is input, the video decoding apparatus 200 may reconstruct a video/image/picture in association with a process by which video information is processed in the video encoding apparatus.

For example, the video decoding apparatus 200 may perform video decoding using a processing unit applied in the video encoding apparatus. Thus, the processing unit block of video decoding may be, for example, a coding unit and, in another example, a coding unit, a prediction unit or a transform unit. The coding unit may be split from the largest coding unit according to the quad tree structure and/or the binary tree structure and/or ternery tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. In the skip mode and the merge mode, a firtly-ordered picture in the reference picture list may be used as a reference picture when motion information of a temporal neighboring block is used.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transformation procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter-prediction of a picture afterward, the encoding apparatus may also dequantize/inverse-transform the quantized transform coefficients to derive a residual block and generate a reconstructed picture based thereon.

Meanwhile, according to the present disclosure, in performing the above-described transform, a vertical component and a horizontal component may be separated and separately transformed. In this case, a transform kernel for a vertical direction and a transform kernel for a horizontal direction may be selected separately. This may be referred to as multiple transform selection (MTS).

Figure 3:
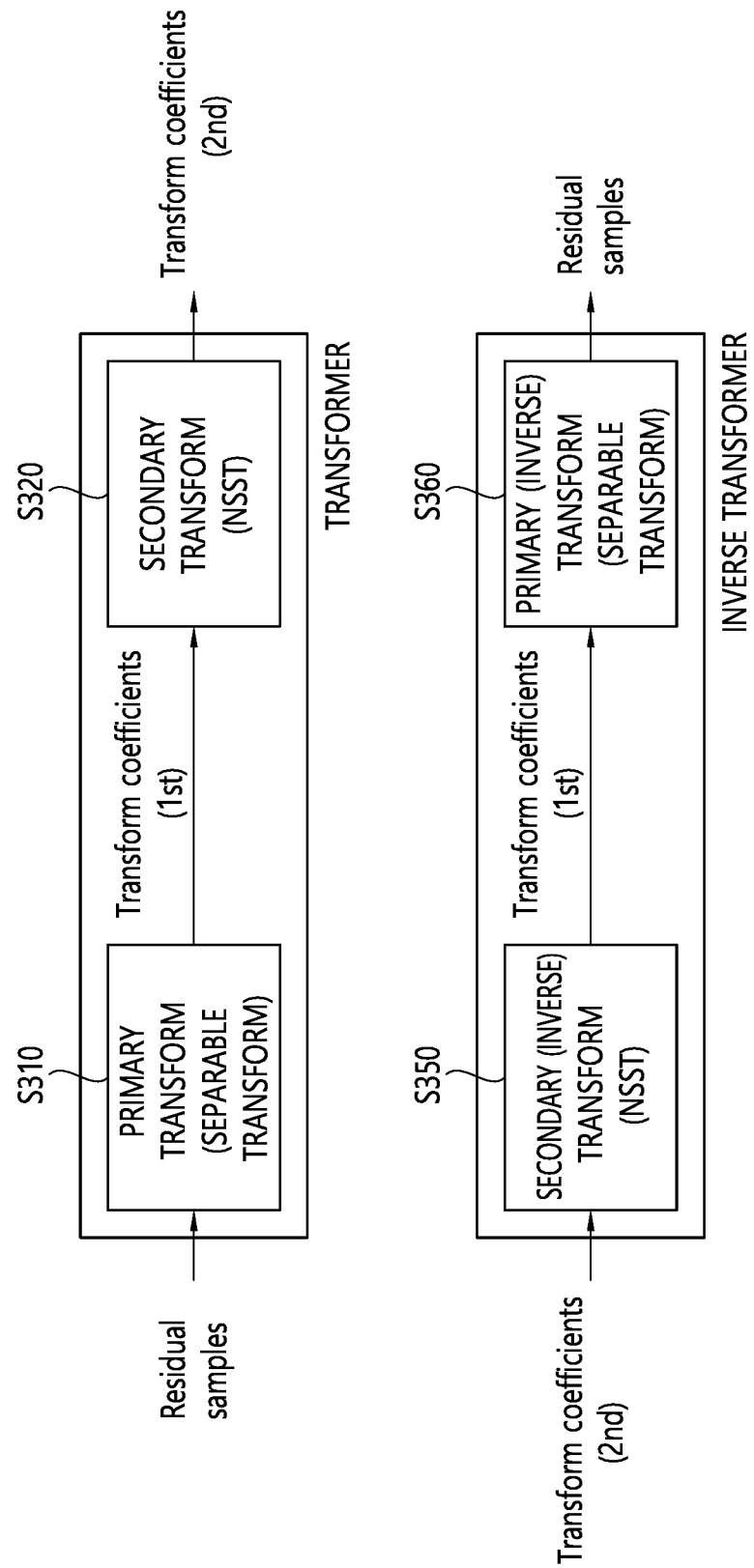
FIG. 3 schematically shows a transform technique according to the present disclosure.

FIG. 3 schematically shows a transform technique according to the present disclosure.

Referring to FIG. 3, a transformer may correspond to the transformer in the encoding apparatus of FIG. 1 described above, and an inverse transformer may correspond to the inverse transformer in the encoding apparatus of FIG. 1 or the inverse transformer in the decoding apparatus of FIG. 2.

The transformer may perform first transform based on the residual samples (residual sample array) in the residual block to derive transform coefficients by (S310). Here, the first transform may be called a separable transform. In the present disclosure, the separable transform may be used interchangeably with terms such as a core transform, a core separable transform, or an MTS-based core transform. The first transform may be performed based on various cosine/sine transforms. In this case, a combination of transforms (transform kernels) may be configured for each transform configuration group. For example, if a set of applicable transforms (transform kernels) is r, transform may be performed based only on transforms (kernels) belonging to r. In this case, r for a horizontal transform and r for a vertical transform may be configured differently or individually.

For example, the transform may represent a method of transforming using various transform kernels such as discrete cosine transform (DCT) type 2, discrete sine transform (DST) type 7, and/or DCT type 8. That is, the transform may represent a transform method for transforming a residual signal (or residual block, residual samples) of a spatial domain into transform coefficients of a frequency domain based on a plurality of transform kernels selected from the transform kernels such as the DCT type 2, the DST type 7, and/or the DCT type 8.

In this case, r may include some or all of the transform kernels such as the DCT type 2, the DST type 7, and/or the DCT type 8 as candidates, and the encoding apparatus may select one of the candidates and signal transform selection information (through a bit stream), thereby instructing the selected candidate to the decoding apparatus. A horizontal transform kernel and/or a vertical transform kernel may be indicated based on the transform selection information. In this case, the horizontal transform kernel and/or the vertical transform kernel may be indicated based on whether inter/intra prediction for the target block is applied and/or a specific prediction mode, as well as the transform selection information. The transform selection information may include, for example, a transform index or an MTS index. Alternatively, the transform selection information may include an MTS horizontal flag and an MTS vertical flag. In this case, the horizontal transform kernel and/or the vertical transform kernel may be indicated based on a combination of a value of the MTS horizontal flag and a value of the MTS vertical flag.

When the transform is applied, transform from the spatial domain to the frequency domain for the residual signal (or residual block, residual samples) may be applied based on DCT type 2, DST type 7 and/or DCT type 8, etc. to generate transform coefficients. In this case, a transform kernel for transforming in the horizontal direction and a transform kernel for transforming in the vertical direction may be individually selected. Here, DCT type 2, DST type 7, and DCT type 8 may be referred to as a transform type, a transform kernel, or a transform core.

For reference, the DCT/DST transform types may be defined based on basis functions, and, for example, the basis functions may be represented as shown in the following table.

TABLE 1

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br><br> where, $\omega_0 = \begin{cases} \sqrt{\dfrac{2}{N}} & i = 0 \\ 1 & i \neq 0 \end{cases}$ $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In addition, according to the present disclosure, the transforms (kernels) used for the transform may further include an identity transform (kernel). The identity transform (kernel) may be denoted by I.

That is, according to the present disclosure, r, the set of applicable transforms (transform kernels) may include at least one of the DCT type 2, the DST type 7, the DCT type 8 and/or the identity transform (kernel) I described above.

When the transform is performed, a vertical transform kernel and a horizontal transform kernel for a target block may be selected from among the transform kernels, and a vertical transform for the target block may be performed based on the vertical transform kernel and a horizontal transform for the target block may be performed based on the horizontal transform kernel. Here, the horizontal transform may represent transform (for the horizontal direction) for horizontal components of the target block and the vertical transform may represent a transform (for vertical direction) for vertical components of the target block. The vertical transform kernel/horizontal transform kernel may be adaptively determined based on the transform selection information indicating a prediction mode and/or a transform subset of a target block (CU or subblock) encompassing the residual block.

Meanwhile, in order to further improve transform performance, a secondary transform may be selectively further performed. Although FIG. 3 is illustrated based on the secondary (inverse) transform, the secondary transform may be omitted.

When the secondary transform is applied, the transformer may derive (secondary) transform coefficients by performing the secondary transform based on the (primary) transform coefficients (S320). The (secondary) transform coefficients may be referred to as modified transform coefficients.

If the primary transform is a transform from the spatial domain to the frequency domain, the secondary transform may be regarded as transform from the frequency domain to the spatial domain transform. The secondary transform may include a non-separable transform. In this case, the secondary transform may be called non-separable secondary transform (NSST) or reduced secondary transform (RST). The NSST may represent secondary-transforming (primary) transform coefficients derived through the primary transform based on a non-separable transform matrix to generate transform coefficients (or secondary transform coefficients) for the residual signal. Here, transform may be applied to the (primary) transform coefficients based on the non-separable transform matrix at a time, rather than separately applying vertical transform and horizontal transform (or independently applying horizontal/vertical transform). In other words, the NSST may represent a transform method of transforming the vertical component and the horizontal component of the (primary) transform coefficients together based on the non-separable transform matrix, rather than separating the vertical component and the horizontal component, and generating transform coefficients (or secondary transform coefficients). The NSST may be applied to a top-left region of a block including (primary) transform coefficients (hereinafter, referred to as a transform coefficient block). The top-left region may include, for example, a 4×4 region, an 8×4 region, a 4×8 region, an 8×8 region, and the like. For example, if both a width (W) and a height (H) of the transform coefficient block are 8 or greater, an 8×8 NSST may be applied to the top-left 8×8 region of the transform coefficient block. In addition, if the width (W) or the height (H) of the transform coefficient block is less than 8, a 4×4 NSST may be applied to a top-left min(8,W)×min(8,H) region of the transform coefficient block.

Specifically, for example, when a 4×4 input block is used, NSST may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 1]

When X is expressed in a vector form, vector $\vec{X}$ may be represented as follows.

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$ [Equation 2]

In this case, the NSST may be calculated as follows.

$$\vec{F} = T \cdot \vec{X}$$ [Equation 3]

Here, $\vec{F}$ denotes a transform coefficient vector and T denotes a 16×16 (non-separable) transform matrix.

A 16×1 transform coefficient vector $\vec{F}$ may be derived through Equation 3, and $\vec{F}$ may be re-organized as 4×4 blocks through a scan order (horizontal, vertical, diagonal, etc.). However, the above-described calculation is an example and hypercube-givens transform (HyGT) or the like may be used for calculation of secondary transform to reduce calculation complexity of the NSST.

Meanwhile, in the NSST, a transform kernel (or transform core, transform type) may be selected mode-dependently. Here, the mode may include an intra-prediction mode and/or an inter-prediction mode.

As described above, the NSST may be performed based on the 8×8 transform or the 4×4 transform determined based on the width (W) and height (H) of the transform coefficient block. That is, the NSST may be performed based on an 8×8 subblock size or a 4×4 subblock size. For example, in order to select the mode-based transform kernel, 35 sets of three NSST kernels may be configured for NSST for both 8×8 subblock size and 4×4 subblock size. That is, 35 transform sets may be configured for the 8×8 sub-block size, and 35 transform sets may be configured for the 4×4 sub-block size. In this case, the 35 transform sets for the 8×8 subblock size may include 38×8 transform kernels, respectively, and in this case, the 35 transform sets for the 4×4 subblock size may include 34×4 transform kernels. However, the size of the transform subblock, the number of sets, and the number of transform kernels in the set are an example and a size other than 8×8 or 4×4 may be used, or n sets may be configured and k transform kernels may be included in each set.

The transform set may also be referred to as a NSST set, NSST set or RST set, and the transform kernel in the set may be referred to as a NSST kernel or RST kernel. Selection of a specific one of the transform sets may be performed, for example, based on an intra prediction mode of a target block (CU or subblock).

For reference, for example, the intra prediction mode may include two non-directional or non-angular intra prediction modes and 65 directional or angular intra-prediction modes. The non-directional intra prediction modes may include a planar intra prediction mode #0 and a DC intra prediction mode #1, and the directional intra prediction modes may include 65 intra prediction modes #2 to #66. However, this is an example and the present disclosure may also be applied even when the number of intra prediction modes is different. Meanwhile, the intra prediction mode #67 may be further used in some cases, and the intra prediction mode #67 may represent a linear model (LM) mode.

Figure 4:
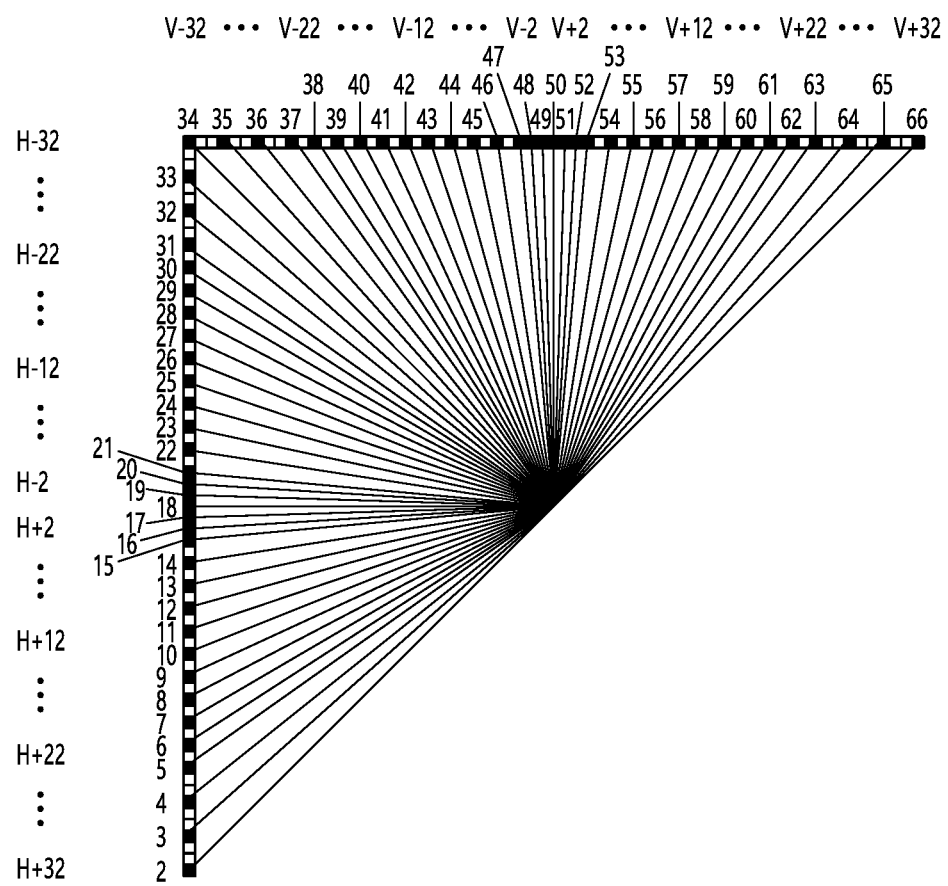
FIG. 4 exemplarily shows intra-directional modes of 65 prediction directions.

FIG. 4 exemplarily shows intra directional modes of 65 prediction directions.

Referring to FIG. 4, intra prediction modes having horizontal directionality and intra prediction modes having vertical directionality may be divided based on the intra prediction mode #34 having a top-left diagonal prediction direction. H and V in FIG. 3 refer to horizontal directionality and vertical directionality, respectively, and the numbers −32 to 32 indicate displacement of 1/32 units on the sample grid position. The intra prediction modes #2 to #33 have horizontal directionality, and the intra prediction modes #34 to #66 have vertical directionality. The intra prediction mode #18 and the intra prediction mode #50 represent a horizontal intra prediction mode and a vertical intra prediction mode, respectively. The intra prediction mode #2 may be referred to as a bottom-left diagonal intra prediction mode, the intra prediction mode #34 may be referred to as a top-left diagonal intra prediction mode, and the intra prediction mode #66 may be referred to as a top-right diagonal intra prediction mode.

In this case, mapping between the 35 transform sets and the intra prediction modes may be represented, for example, as shown in the following table. For reference, when the LM mode is applied to a target block, the secondary transform may not be applied to the target block.

TABLE 2

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |

| intra mode | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|---|---|---|---|---|---|---|
| set | 23 | 24 | 25 | 26 | 27 | 28 | 29 | 30 | 31 | 32 | 33 | 34 | 33 | 32 | 31 | 30 | 29 | 28 | 27 | 26 | 25 | 24 | 23 |

| intra mode | 46 | 47 | 48 | 49 | 50 | 51 | 52 | 53 | 54 | 55 | 56 | 57 | 58 | 59 | 60 | 61 | 62 | 63 | 64 | 65 | 66 | 67(LM) |
|---|---|---|---|---|---|---|---|---|---|---|---|---|---|---|---|---|---|---|---|---|---|---|
| set | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

Meanwhile, when it is determined that a specific set is used, one of k transform kernels in the specific set may be selected through a NSST index. The encoding apparatus may derive a NSST index indicating a specific transform kernel based on a rate-distortion (RD) check and may signal the NSST index to the decoding apparatus. The decoding apparatus may select one of k transform kernels in the specific set based on the NSST index. For example, NSST index value 0 may indicate a first NSST kernel, NSST index value 1 may indicate a second first NSST kernel, and NSST index value 2 may indicate the first NSST kernel. Alternatively, the NSST index value 0 may indicate that the first NSST is not applied to the target block, and the NSST index values 1 to 3 may indicate the three transform kernels.

Referring back to FIG. 3, the transformer may perform the NSST based on the selected transform kernels and obtain (secondary) transform coefficients. The transform coefficients may be derived as quantized transform coefficients through the quantizer as described above, and encoded and signaled to the decoding apparatus and delivered to the dequantizer/inverse-transformer in the encoding apparatus.

Meanwhile, when the secondary transform is omitted as described above, the (primary) transform coefficients, which are outputs of the primary (separable) transform, may be derived as quantized transform coefficients through the quantizer as described above and may be encoded and signaled to the decoding apparatus and delivered to the dequantizer/inverse-transformer in the encoding apparatus.

The inverse transformer may perform a series of procedures in a reverse order of the procedure performed by the transformer described above. The inverse transformer may receive (inverse-quantized) transform coefficients, perform secondary (inverse) transform to derive (primary) transform coefficients (S350), and perform primary (inverse) transform on the (primary) transform coefficients to acquire a residual block (residual samples). Here, the primary transform coefficients may be referred to as modified transform coefficients from the viewpoint of the inverse transformer. As described above, the encoding apparatus and the decoding apparatus may generate a reconstructed block based on the residual block and the predicted block and generate a reconstructed picture based on the reconstructed block.

Meanwhile, as described above, when the secondary (inverse) transform is omitted, the (dequantized) transform coefficients may be received and the primary (separable) transform may be performed thereon to acquire a residual block (residual samples). As described above, the encoding apparatus and the decoding apparatus may generate a reconstructed block based on the residual block and the predicted block and generate a reconstructed picture based on the reconstructed block.

The transform configuration group for the (primary) separable transform may be variously configured in consideration of transformation efficiency and may be configured as shown in the following table, for example.

[Table 3]

TABLE 3

| Configuration group | Index | Horizontal (row) transform | Vertical (column) transform | 35 intra Prediction modes | 67 intra Prediction modes |
|---|---|---|---|---|---|
| Group 0 (60) | 0 | DST7 | DST7 | 0 | 0 |
|  | 1 | DCT5 | DST7 |  |  |
|  | 2 | DST7 | DCT5 |  |  |
|  | 3 | DCT5 | DCT5 |  |  |
| Group 1 (61) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
|  | 1 | DST1 | DST7 |  |  |
|  | 2 | DST7 | DST1 |  |  |
|  | 3 | DST1 | DST1 |  |  |
| Group 2 (62) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
|  | 1 | DCT8 | DST7 |  |  |
|  | 2 | DST7 | DCT8 |  |  |
|  | 3 | DCT8 | DCT8 |  |  |
| Group 3 (63) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
|  | 1 | DCT5 | DST7 |  |  |
|  | 2 | DST7 | DCT8 |  |  |
|  | 3 | DCT5 | DCT8 |  |  |
| Group 4 (64) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
|  | 1 | DCT8 | DST7 |  |  |
|  | 2 | DST7 | DCT5 |  |  |
|  | 3 | DCT8 | DCT5 |  |  |
| Group 5 (65 | 0 | DCT8 | DCT8 | Inter prediction | Inter prediction |
|  | 1 | DST7 | DCT8 |  |  |
|  | 2 | DCT8 | DST7 |  |  |
|  | 3 | DST7 | DST7 |  |  |

In the present disclosure, j-th transform set candidate for a transform configuration group $G_i$ may be represented as a pair shown in Equation 3 below.

$$(H(G_i,j), V(G_i,j)) \quad \text{[Equation 3]}$$

Here, H ($G_i$, j) indicates horizontal transform for a j-th candidate, and V ($G_i$, j) indicates vertical transform for the j-th candidate. For example, in FIG. 6, it may be written as follows: $H(G_3, 2)=DST7$, $V(G_3, 2)=DCT8$. Depending on the context, a value assigned to $H(G_i, j)$ or $V(G_i, j)$ may be a nominal value for distinguishing the transforms as in the example described above, an index value indicating corresponding transform, or 2 dimensional (2D) matrix for the corresponding transform.

In addition, in the present disclosure, 2D matrix values for DCT and DST may be expressed as Equations 4 to 5 below.

$$\text{DCT type 2: } c_N^{II}, \text{ DCT type 8: } c_N^{VII} \quad \text{[Equation 4]}$$

$$\text{DST type 7: } s_N^{VII}, \text{ DST type 4: } s_N^{IV} \quad \text{[Equation 5]}$$

Here, whether it is DST or DCT is represented by S or C, a type number is denoted by superscript in the form of Roman numerals, and N of the subscript indicates that it is N×N transform. In addition, a 2D matrix such as $C_N^{II}$ and $S_N^{IV}$ assumes that column vectors form a transform basis.

Referring to Table 3, transform configuration groups are determined based on a prediction mode, and the number of groups may total six (G0 to G5). In addition, G0 to G4 corresponds to a case where intra prediction is applied, and G5 represents transform sets applied to a residual block generated by inter prediction.

A transform set includes horizontal transform (or row transform) applied to rows of the corresponding 2D block and vertical transform (or column transform) applied to columns.

Here, all transform configuration groups may each have 4 transform set candidates. The four transform set candidates may be selected or determined through 0 to 3 transform selection information, and the transform selection information may be encoded and transmitted from the encoding apparatus to the decoding apparatus.

In an embodiment, statistical data of the residual data (or residual signal) acquired through intra prediction may be different according to the intra prediction mode. Therefore, as shown in Table 3, other transforms than a general cosine transform may be applied to each intra prediction mode.

Referring to Table 3, the case of using 35 intra prediction modes and the case of using 67 intra prediction modes are shown. A plurality of transform sets may be applied to each transform configuration group classified in each intra prediction mode column. For example, the plurality of transform sets may be configured as four (row direction transform, column direction transform) combinations. As a specific example, in group 0, DST-7 and DCT-5 may be applied to both the row (horizontal) direction and the column (vertical) direction, and thus, a total of four combinations may be made.

Since a total of 4 transform kernel combinations can be applied to each intra prediction mode, transform selection information for selecting one of them may be transmitted for a coding unit or each transform unit in the coding unit.

Meanwhile, $C_N^{VIII}$ and $S_N^{VII}$ satisfy the relational expression in Equation 6 below.

$$C_N^{VIII} = J_N S_N^{VII} D_N \quad \text{[Equation 6]}$$

where $$[J_N]_{i,j,i,j=0,\ldots,N-1} = \begin{cases} 1, & j = N-1-i \\ 0, & \text{otherwise} \end{cases}$$

and $$[D_N]_{i,j,i,j=0,\ldots,N-1} = \text{diag}((-1)^k),$$

$$k = 0, \ldots, N-1 = \begin{cases} (-1)^i, & i = j \\ 0, & i \neq j \end{cases}$$

In Equation 6, $J_N$ is a matrix having a value of 1 only in an inverse diagonal line, and $D_N$ is a matrix in which 1 and −1 alternately appear only in a diagonal line.

Equation 7 below shows a process of obtaining an N×1 transform coefficient vector y by applying forward transform $((C_N^{VIII})^T)$ of DCT8 to the N×1 input vector $x=[x_0\ x_1\ \ldots\ x_{N-1}]^T$.

$$y = (C_N^{VIII})^T x = D_N (S_N^{VII})^T J_N x = (S_N^{VII,A})^T x_R = (S_N^{VII,AR})^T x \quad \text{[Equation 7]}$$

and $S_N^{VII,AR} = [s_{R,0}\ -s_{R,1}\ s_{R,2}\ -s_{R,3}\ \ldots\ (-1)^{N-2} s_{R,N-2}\ (-1)^{N-1} s_{R,N-1}]$ if $S_N^{VII} = [s_0\ s_1\ \ldots\ s_{N-1}]$ and $s_{R,1} = J_N s_1$ Here, superscript A, as an abbreviation of alternate, denotes that symbols are alternately changed, superscript R means that the order of the vectors is changed, and superscript AR means that both are applied.

When Equation 7 is developed by applying Equation 6, transform for $C_N^{VIII}$ may be applied using only transform basis vectors forming $S_N^{VII}$, a separate memory space for storing $C_N^{VIII}$ is unnecessary in a codec.

When forward transform is applied to $C_N^{VIII}$ as in Equation 7, $(S_N^{VII,A})^T$ may be multiplied by obtaining $x_R$, or alternatively, $(S_N^{VII,AR})^T$ may be multiplied while x remains as it is. Also, when $(S_N^{VII,A})^T$ and $(S_N^{VII,AR})^T$ are applied, sign inversion is not applied to the base vectors forming $S_N^{VII}$, but sign inversion may be applied to $x_R$ to obtain each base vector and a dot product for x as shown in Equation 8.

$$y = D_N (S_N^{VII})^T J_N x \quad \text{[Equation 8]}$$

$$= \begin{bmatrix} s_0^T & 0 & \cdots & 0 \\ 0 & s_1^T & \cdots & 0 \\ \vdots & \vdots & \ddots & \vdots \\ 0 & 0 & \cdots & s_{N-1}^T \end{bmatrix} \begin{bmatrix} (-1)^{N-1} x_R \\ (-1)^{N-2} x_R \\ \vdots \\ x_R \end{bmatrix}$$

Equations 7 and 8 propose a method of removing a memory required to store $C_N^{VIII}$ by expressing $C_N^{VIII}$ as kernel coefficient data of $S_N^{VII}$. In addition, instead of applying the relational expression of Equation 6 as it is, it may be configured to use $C_N^{VIII,F}$ instead of $C_N^{VIII}$ as in Equation 9 below.

$$C_N^{VIII,F} = S_N^{VII,R} = J_N S_N^{VII} = [s_{R,0}\ s_{R,1}\ \ldots\ s_{R,N-1}]$$

$$y = (C_N^{VIII,F})^T x = (S_N^{VII})^T J_N x = (S_N^{VII})^T x_R = (S_N^{VII,R})^T x \quad \text{[Equation 9]}$$

Here, $C_N^{VIII,F}$ denotes flipped DST7. When $C_N^{VIII,F}$ is used as in Equation 7, it is the same as applying $S_N^{VII}$ to $x_R$ instead of x and there is no need to alternately apply sign inversion as shown in Equations 7 and 8. A method of applying a backward (inverse) transform corresponding to Equation 7 is the same as in Equation 10, and a method of applying the backward (inverse) transform corresponding to Equation 9 is the same as in Equation 11.

$$x = C_N^{VIII} y = J_N S_N^{VII} D_N y = (S_N^{VII,R}) y_A = (S_N^{VII,AR}) y \quad \text{[Equation 10]}$$

where $y_A = \lfloor y_0 \; -y_1 \; y_2 \; -y_3 \; \ldots \; (-1)^{N-2} y_{N-2} \; (-1)^{N-1} y_{N-1} \rfloor$ $$x = C_N^{VIII,F} = J_N S_N^{VII} y = (S_N^{VII,R}) y = J_N z = z_R \quad \text{[Equation 11]}$$

where $z = S_N^{VII} y$, $z_R = [z_{N-1} \; z_{N-2} \; \ldots \; z_0]$

In addition, according to the present disclosure, it may be configured to have a different $\Gamma$ according to the transform configuration group $\Gamma$. In addition, it may be configured to have a different $\Gamma$ according to a length of each side of a 2D block, as well as the transform configuration group, and it may be configured to have a different $\Gamma$ according to a block shape.

For example, when a size of a transform target block (current block) is M×N 2D block, a different transform may be applied to each of M rows and a different transform may be applied to each of N columns. FIG. 12 shows a case where all the horizontal (row) transforms and vertical (column) transforms being applied are expressed by symbols.

Horizontal (row) transforms: $T_{H,r}, r = 0, \ldots, M-1$

Vertical (column) transforms: $T_{V,c}, c = 0, \ldots, N-1$ [Equation 12]

$T_{H,r}$ and $T_{V,c}$ above may be an element belonging to a specific transform set. For example, if there is a transform set $\Gamma_H^{N \times N}$ for $T_{H,r}$ and a transform set $\Gamma_V^{M \times M}$ for $T_{V,c}$, they may be expressed as shown in Equation 13 and Equation 14 below.

$$\Gamma_H^{N \times N} = \{T_0^{N \times N} \; T_1^{N \times N} \ldots T_{P-1}^{N \times N}\} \quad \text{[Equation 13]}$$

where $|\Gamma_H^{N \times N}| = P$ (a number of elements constituting $\Gamma_H^{N \times N}$, cardinality) where $$\Gamma_V^{M \times M} = \{S_0^{M \times M} \; S_1^{M \times M} \ldots S_{Q-1}^{M \times M}\} \quad \text{[Equation 13]}$$

where $|\Gamma_V^{M \times M}| = Q$ (a number of elements constituting $\Gamma_V^{M \times M}$, cardinality)

Here, $T_{H,r} \in \Gamma_H^{N \times N}, \forall r$ and $T_{H,c} \in \Gamma_V^{M \times M}, \forall c$ are established, and $T_{H,r}$ and $T_{V,c}$ may overlap each other. That is, they may have the same transform.

If all $T_{H,r}$ are the same transform and if $T_{V,c}$ are also the same transform, it becomes a normal 2D separable transform. In the case of M=N, $\Gamma_H^{N \times N}$ and $\Gamma_V^{M \times M}$ may have a common element, that is, they may have an intersection rather than an empty set.

Examples of $\Gamma_H^{N \times N}$ and $\Gamma_V^{M \times M}$ are shown in Equation 15 and Equation 17. For convenience, in the present disclosure, and $\Gamma_H^{N \times N}$ and $\Gamma_V^{M \times M}$ will be collectively referred to as $\Gamma$ hereinafter and it is assumed that an applied direction (horizontal or vertical) or transform size (M×M or N×N) can be recognized by context.

$$\Gamma = \{C_N^{II}, C_N^{V}, C_N^{VIII}, S_N^{I}, S_N^{VII}\} \quad \text{[Equation 15]}$$

$$\Gamma = \{C_N^{VIII}, S_N^{VII}\} \quad \text{[Equation 16]}$$

$$\Gamma = \{C_\cdot^{II}, C_\cdot^{V}, C_\cdot^{VIII}, S_\cdot^{I}, S_\cdot^{VII}\} = \{C^{II}, C^{V}, C^{VIII}, S^{I}, S^{VII}\} \quad \text{[Equation 17]}$$

It may be configured to have a different $\Gamma$ according to the transform configuration group $\Gamma$. In addition, it may be configured to have a different $\Gamma$ according to a length of each side of a 2D block, as well as the transform configuration group, and it may be configured to have a different $\Gamma$ according to a block shape.

Figure 6:
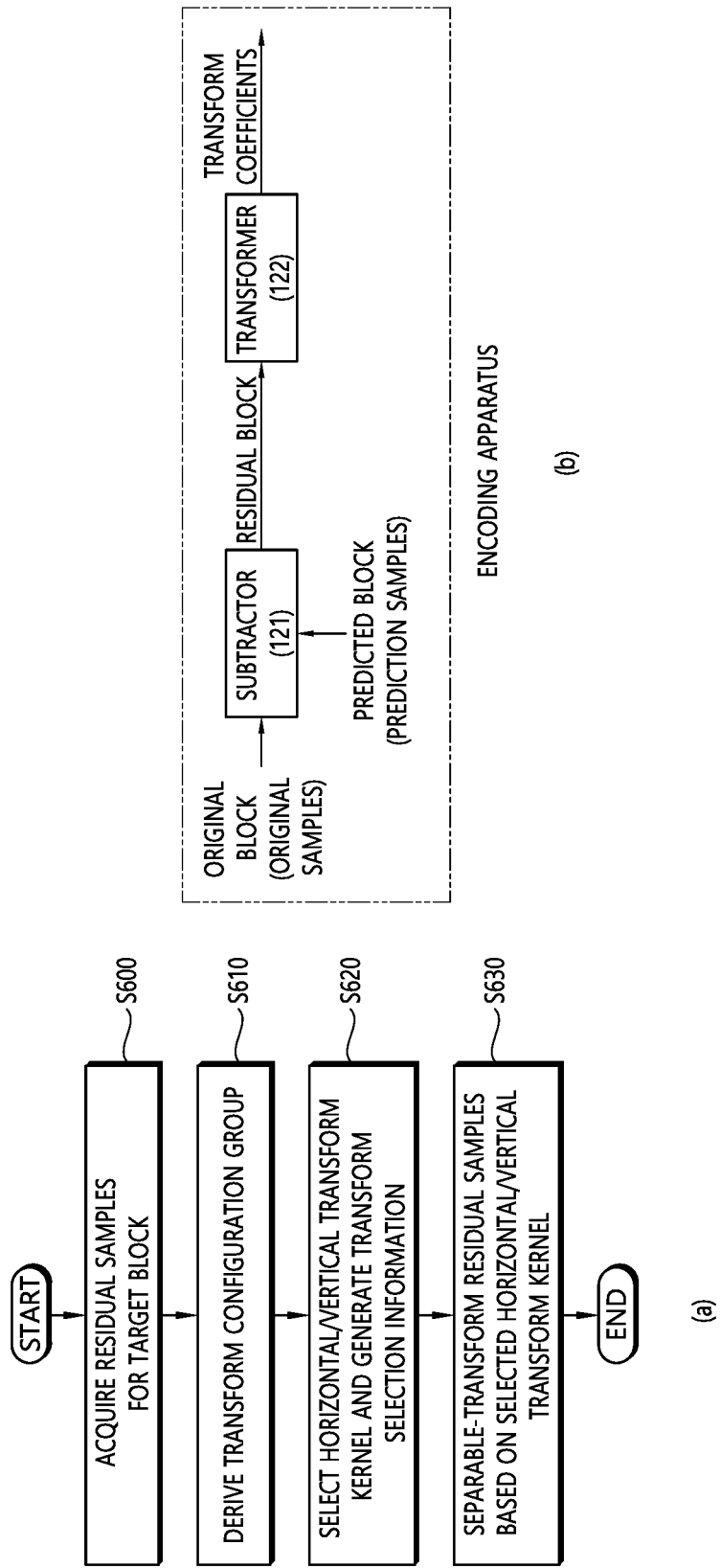
FIG. 6 schematically shows an example of a video/image encoding method including a transform method and an apparatus thereof according to the present disclosure.

In Equation 17, a transform size is not specified (indicated by •), which means that a size is not considered in selecting (or determining) transform or an appropriate size is adaptively selected according to a situation in which transform is applied. For example, if $C^{IV}$ is selected, $C_8^{IV}$ is applied in case where a length is 8 and $C_4^{IV}$ is used in case where the length is 4. For example, $\Gamma$ for horizontal transform in $G_1$ in FIG. 6 is $\Gamma = \{S^{VII}, S_H^{I}\}$.

Table 4 below shows an example of configuring a transform configuration group based on at least one of a prediction mode, a block size, or a block shape.

TABLE 4

| Configuration group | | Horizontal (row) transform Configuration | Vertical (column) transform Configuration |
|---|---|---|---|
| Group 0 ($G_0$) | 0 | H ($G_0$, 0) | V ($G_0$, 0) |
| | 1 | H ($G_0$, 1) | V ($G_0$, 1) |
| | ... | ... | ... |
| | $n_{G_0} - 1$ | H ($G_0$, $n_{G_0} - 1$) | V ($G_0$, $n_{G_0} - 1$) |
| Group 1 ($G_1$) | 0 | H ($G_1$, 0) | V ($G_1$, 0) |
| | 1 | H ($G_1$, 1) | V ($G_1$, 1) |
| | ... | ... | ... |
| | $n_{G_1} - 1$ | H ($G_1$, $n_{G_1} - 1$) | V(G, $n_{G_1} - 1$) |
| ... | ... | ... | ... |
| Group L-1 ($G_{L-1}$) | 0 | H($G_{L-1}$, 0) | V($G_{L-1}$, 0) |
| | 1 | H($G_{L-1}$, 1) | V($G_{L-1}$, 1) |
| | ... | ... | ... |
| | $n_{G_{L-1}} - 1$ | H ($G_{L-1}$, $n_{G_{L-1}} - 1$) | V ($G_{L-1}$, $n_{G_{L-1}} - 1$) |

As described above, the j-th transform set candidate for the transform configuration group $G_i$ is expressed as (H (Gi, j), V (Gi, j)). Here, H($G_i$, j) and V($G_i$, j) indicate horizontal transform and vertical transform being applied, respectively.

Since the horizontal transform and the vertical transform of each candidate are a single transform (e.g., DST7, DCT5), they are expressed by equation like H($G_i$, j)=DST7, but if different transforms can be applied to all the rows or columns, H($G_i$, j) and V($G_i$, j) may be expressed as tuples including M elements and N elements as shown in Equation 18 below.

$$H(G_i, j) = (T_{j,0}, T_{j,1}, \ldots, T_{j,M-1})$$

$$V(G_i, j) = (S_{j,0}, S_{j,1}, \ldots, S_{j,N-1}) \quad \text{[Equation 18]}$$

In Equation 18 above, $T_{j,k}$, k=0, ..., M-1 may each be selected from different $\Gamma$ or may be specified from the same $\Gamma$. $S_{j,k}$ k=0, ..., N-1 is no different. Table 4 shows a general transform configuration group by using the notation in Equation 18.

The transform configuration group of Table 4 may be configured based on the prediction mode as shown in FIG. 3 or may be configured based on a combination of at least one of a prediction mode, a block size, and a block shape. For example, transform candidates applied to a 4×8 residual block generated by intra prediction mode 0 (planar mode) may be assigned to group 0. Here, $H(G_0, j)$ is a tuple including four 8×8 transforms and $V(G_0, j)$ is a tuple including eight 4×4 transforms.

As shown in FIG. 4, the transform configuration groups may be configured by classifying all cases at once, but the transform configuration groups may be combined by classifying into a plurality of tables.

TABLE 5

| 4 × 4 Horizontal transform Configuration group | | Horizontal (row) transform Configuration |
|---|---|---|
| Horiz. Group 0 ($HG_0^4$) | 0 | $H(HG_0^4, 0)$ |
| | 1 | $H(HG_0^4, 1)$ |
| | ... | ... |
| | $n_{HG_0}^4 - 1$ | $H(HG_0^4, n_{HG_0}^4 - 1)$ |
| Horiz. Group 1 ($HG_1^4$) | 0 | $H(HG_1^4, 0)$ |
| | 1 | $H(HG_1^4, 1)$ |
| | ... | ... |
| | $n_{HG_1}^4 - 1$ | $H(HG_1, n_{HG_1}^4 - 1)$ |
| ... | ... | ... |
| Horiz. Group L-1 ($HG_{L-1}^4$) | 0 | $H(HG_{L-1}^4, 0)$ |
| | 1 | $H(HG_{L-1}^4, 1)$ |
| | ... | ... |
| | $n_{HG_{L-1}}^4 - 1$ | $H(HG_{L-1}^4, n_{HG_{L-1}}^4 - 1)$ |

TABLE 6

| 4 × 4 Vertical transform Configuration group | | Vertical (column) transform Configuration |
|---|---|---|
| Vert. Group 0 ($VG_0^4$) | 0 | $H(VG_0^4, 0)$ |
| | 1 | $H(VG_0^4, 1)$ |
| | ... | ... |
| | $n_{VG_0}^4 - 1$ | $H(VG_0^4, n_{VG_0}^4 - 1)$ |
| Vert. Group 1 ($VG_1^4$) | 0 | $H(VG_1^4, 0)$ |
| | 1 | $H(VG_1^4, 1)$ |
| | ... | ... |
| | $n_{VG_1}^4 - 1$ | $H(VG_1, n_{VG_1}^4 - 1)$ |
| ... | ... | ... |
| Vert. Group L-1 ($VG_{L-1}^4$) | 0 | $H(VG_{L-1}^4, 0)$ |
| | 1 | $H(VG_{L-1}^4, 1)$ |
| | ... | ... |
| | $n_{VG_{L-1}}^4 - 1$ | $H(VG_{L-1}^4, n_{VG_{L-1}}^4 - 1)$ |

Table 2 and Table 6, which are embodiments to which the present disclosure is applied, are tables for explaining a method of combining transform configuration groups by classifying into a plurality of tables based on at least one of a prediction mode, a block size, and a block shape.

Table 5 shows a group configuring a row transform (or horizontal transform), and Table 6 shows a group configuring a column transform (or a vertical transform).

As an embodiment of the present disclosure, a method for classifying a table for configuring a row transform and a table for configuring a column transform is provided.

If the encoding apparatus transmits transform selection information indicating which transform set is to be used, a row transform index for designating row transform ($H(HG_i, j)$) and a column transform index indicating column transform ($V(VG_i, j)$) may be signaled or one transform index including two index information may be signaled as the transform selection information.

In Table 5 and Table 6, only the table for 4×4 transform is provided, but the present disclosure is not limited thereto.

For example, transform configuration group tables may be defined for different sizes (e.g. 8×8, 32×32).

If a transform is applied to a 16×8 block, a 8×8 horizontal transform table may be referred to in the horizontal direction and a 16×16 vertical transform table may be referred to in the vertical direction.

Meanwhile, for example, a transform configuration group may be configured using one transform set as shown in the following table.

TABLE 7

| Mode group | | Horizontal (row) transform | Vertical (column) transform | Prediction modes |
|---|---|---|---|---|
| Group 0 ($G_0$) | 0 | $S.^{VII}$ | $S.^{VII}$ | Intra prediction |
| | 1 | $S.^{VII,R}$ | $S.^{VII}$ | |
| | 2 | $S.^{VII}$ | $S.^{VII,R}$ | |
| | 3 | $S.^{VII,R}$ | $S.^{VII,R}$ | |
| Group 1 ($G_1$) | 0 | $S.^{VII,R}$ | $S.^{VII,R}$ | Inter prediction |
| | 1 | $S.^{VII}$ | $S.^{VII,R}$ | |
| | 2 | $S.^{VII,R}$ | $S.^{VII}$ | |
| | 3 | $S.^{VII}$ | $S.^{VII}$ | |

As the transform set Γ, a modified form of DST7 and DST7 may be used and the same Γ may be applied to the tuple) ($H(G_i, j)$) for all the horizontal transforms and the tuple) ($V(G_i, j)$) for the vertical transforms. Here, for the transforms configuring the transform set Γ, a corresponding size may be selected according to situations, without distinguishing between transform sizes (4×4, 8×8, etc.). Transform sets F available in relation thereto may be listed as shown in Equation 19 below.

$$\Gamma = \{S.^{VII}, S.^{VII,A}\}$$

$$\Gamma = \{S.^{VII}, S.^{VII,AR}\}$$

$$\Gamma = \{S.^{VII}, S.^{VII,R}\} \quad \text{[Equation 19]}$$

Here, superscript A is an abbreviation of alternate, indicating that the codes are alternately changed, superscript R means that the order of the vectors is changed, and superscript AR means that both are applied.

Here, superscript A, as an abbreviation of alternate, denotes that symbols are alternately changed, superscript R means that the order of the vectors is changed, and superscript AR means that both are applied.

In Equation 19, since $S.^{VII,A}$, $S.^{VII,AR}$, $S.^{VII,R}$ use the same kernel coefficient data as $S.^{VII}$, it is unnecessary to add separate kernel coefficient data in fact.

In addition, since a general codec already includes DCT2, DCT2 may be included in the transform set F without adding a memory. Examples of transform sets F including DCT2 are as shown in Equation 20 below.

$$\Gamma = \{S.^{VII}, S.^{VII,A} C.^{II}\}$$

$$\Gamma = \{S.^{VII}, S.^{VII,AR} C.^{II}\}$$

$$\Gamma = \{S.^{VII}, S.^{VII,R} C.^{II}\} \quad \text{[Equation 20]}$$

The transform configuration group may be configured as shown in Table 3 or Table 4 by using the transform sets Γ in Equation 19 or Equation 20.

For example, when configured as shown in Table 3, the same horizontal transform may be applied to all rows for one block and the same vertical transform may be applied to all columns.

In addition, in Table 3, since the tables are not classified according to the shape or size of the blocks, it is only necessary to select a transform corresponding to the size of the corresponding block for the designated transform. When configuring as shown in Table 3, candidates of all the transform configuration group may be described by selecting one of the transform sets Γ presented in Equation 19 or the candidates of all the transform configuration group may be determined by selecting one of the transform sets Γ presented in Equation 20 in order to reduce memory required to store the transform kernel coefficient data.

Table 7 shows an example in which transform sets of all transform configuration groups are described using only the transform set $\Gamma=\{S_\cdot^{VII}, S_\cdot^{VII,R}\}$.

Table 8 below shows an example of configuring a transform configuration group using different transform sets based on transform block sizes.

$\Gamma=\{S_\cdot^{VII}, S_\cdot^{VII,R} S_\cdot^{IV}, S_\cdot^{IV,R}\}$ $\Gamma=\{S_\cdot^{VII}, S_\cdot^{VII,R} S_\cdot^{IV}, S_\cdot^{IV,R}, C_\cdot^{II}\}$ [Equation 23]

$\Gamma=\{S_\cdot^{I}, S_\cdot^{II}, S_\cdot^{III}, S_\cdot^{IV}, S_\cdot^{V}, S_\cdot^{VI}, S_\cdot^{VII}, S_\cdot^{VIII}, C_\cdot^{I}, C_\cdot^{II}, C_\cdot^{III}, C_\cdot^{IV}, C_\cdot^{V}, C_\cdot^{VI}, C_\cdot^{VII}, C_\cdot^{VIII}\}$ [Equation 24]

$\Gamma=\{S_\cdot^{VII}, S_\cdot^{VII,R} C_\cdot^{II}, KLT_1, KLT_2\}$ $\Gamma=\{S_\cdot^{VII}, S_\cdot^{VII,R} C_\cdot^{II}, SOT_1, SOT_2\}$ $\Gamma=\{KLT_1, KLT_2, KLT_3, KLT_4\}$ $\Gamma=\{SOT_1, SOT_2, SOT_3\}$ [Equation 25]

TABLE 8

| Configuration group | | Horizontal (row) transform configuration | Vertical (column) transform Configuration |
|---|---|---|---|
| Group 0 (G₀) | 0 | ($S_4^{VII}$, $S_4^{VII}$, $S_4^{VII}$, $S_4^{VII}$, $S_4^{VII,R}$, $S_4^{VII,R}$, $C_4^{II}$, $C_4^{II}$) | ($S_8^{VII}$, $S_8^{VII}$, $S_8^{VII}$, $C_8^{II}$) |
| | 1 | ($S_4^{VII}$, $S_4^{VII}$, $S_4^{VII}$, $S_4^{VII,R}$, $S_4^{VII,R}$, $C_4^{II}$, $C_4^{II}$, $C_4^{II}$) | ($S_8^{VII}$, $S_8^{VII}$, $S_8^{VII,R}$, $C_8^{II}$) |
| | 2 | ($S_4^{VII}$, $S_4^{VII}$, $S_4^{VII,R}$, $S_4^{VII,R}$, $C_4^{II}$, $C_4^{II}$, $C_4^{II}$, $C_4^{II}$) | ($S_8^{VII}$, $S_8^{VII}$, $C_8^{II}$, $C_8^{II}$) |
| | 3 | ($S_4^{VII}$, $S_4^{VII,R}$, $C_4^{II}$, $C_4^{II}$, $C_4^{II}$, $C_4^{II}$, $C_4^{II}$, $C_4^{II}$) | ($S_8^{VII}$, $S_8^{VII,R}$, $C_8^{II}$, $C_8^{II}$) |
| ... | | ... ... | ... |

As an example of configuring a transform configuration group in the manner of Table 4, Table 8 shows a case where a transform set $\Gamma=\{S_4^{VII}, S_4^{VII,R}, C_4^{II}\}$ is used for the 4×4 transform and a transform set $\Gamma=\{S_8^{VII}, S_8^{VII,R}, C_8^{II}\}$ is used for the 8×8 transform.

For example, Group 0 of Table 8 corresponds to an 8×4 block to which a planar mode and a DC mode are applied.

In an embodiment of the present disclosure, when it is assumed that DST4 can be used instead of DST7, the transform set F may be set in the same manner as in the case of Equations 19 and 20. The Equation 21 below shows examples using only $S_\cdot^{IV}$ as the transform kernel coefficient data and Equation 22 shows examples using $S_\cdot^{IV}$ and $C_\cdot^{II}$.

$\Gamma=\{S_\cdot^{IV}, S_\cdot^{IV,A}\}$ $\Gamma=\{S_\cdot^{IV}, S_\cdot^{IV,AR}\}$ $\Gamma=\{S_\cdot^{IV}, S_\cdot^{IV,R}\}$ [Equation 21]

$\Gamma=\{S_\cdot^{IV}, S_\cdot^{IV,A} C_\cdot^{II}\}$ $\Gamma=\{S_\cdot^{IV}, S_\cdot^{IV,AR} C_\cdot^{II}\}$ $\Gamma=\{S_\cdot^{IV}, S_\cdot^{IV,R} C_\cdot^{II}\}$ [Equation 22]

Similarly, transform sets as in Table 7 or Table 8 may be constructed using the transform sets Γ presented in Equations 21 and 22. If the transform configuration group varies according to the block size or block shape, the transform set r corresponding to the block size may be selected and used.

Basically, the transform set may include any transforms. For example, as shown in Equation 23 below, the transform set Γ may be configured to include all transforms related to $S_\cdot^{VII}$ and $S_\cdot^{IV}$. Alternatively, the transform set Γ may be configured to include all kinds of cosine transforms/sine transforms as shown in Equation 24. Alternatively, the transform set Γ may be configured to include a Karhunen Loeve Transform (KLT) or a spare orthonormal transform (SOT) acquired from training data as shown in Equation 25.

Meanwhile, according to the present disclosure, a spanned set may be configured for the separable transform described above as follows.

TABLE 9

| Seed | Maximally spanned set composed of trigonometric transforms |
|---|---|
| {$C^{II}$ or $S^{II}$} | {$C^{II}$ or $S^{II}$} |
| {$C^{VIII}$ or $S^{VII}$} | {$C^{VIII}$ or $S^{VII}$} |
| {$C^{IV}$ or $S^{IV}$} | {$C^{IV}$ or $S^{IV}$} |
| {$C^{II}$ or $S^{II}$, $C^{VIII}$ or $S^{V}$ or $S^{VI}$ or $S^{VII}$} | {$C^{II}$, $C^{VIII}$, $S^{II}$, $S^{V}$, $S^{VI}$, $S^{VII}$} |
| {$C^{II}$ or $S^{II}$, $C^{IV}$ or $S^{IV}$} | {$C^{II}$, $S^{II}$, $C^{IV}$, $S^{IV}$} |

An equation for the cosine transform applied in the present disclosure is as shown in Equation 26 below.

$(C_N^I)_{lk} = \gamma_k \gamma_l \sqrt{\frac{2}{N-1}} \cos\left(kl\frac{\pi}{N-1}\right)$, [Equation 26]

$k, l = 0, 1, \ldots, N-1$ $(C_N^{II})_{lk} = \sqrt{\frac{2}{N}} \sigma_k \cos\left[\left(l+\frac{1}{2}\right)\frac{k\pi}{N}\right]$, $k, l = 0, 1, \ldots, N-1$ $(C_N^{III})_{lk} = \sqrt{\frac{2}{N}} \sigma_l \cos\left[l\left(k+\frac{1}{2}\right)\frac{\pi}{N}\right]$, $k, l = 0, 1, \ldots, N-1$ $(C_N^{IV})_{lk} = \sqrt{\frac{2}{N}} \cos\left[\left(l+\frac{1}{2}\right)\left(k+\frac{1}{2}\right)\frac{\pi}{N}\right]$, $k, l = 0, 1, \ldots, N-1$ $(C_N^{V})_{lk} = \frac{2}{\sqrt{2N-1}} \sigma_l \sigma_k \cos\left[kl\left(\frac{2\pi}{2N-1}\right)\right]$, $k, l = 0, 1, \ldots, N-1$ -continued $$(C_N^{VI})_{lk} = \frac{2}{\sqrt{2N-1}} \sigma_k \varepsilon_l \cos\left[\left(l+\frac{1}{2}\right)k \frac{2\pi}{2N-1}\right],$$

$$k, l = 0, 1, \ldots, N-1$$

$$(C_N^{VII})_{lk} = \frac{2}{\sqrt{2N-1}} \varepsilon_k \sigma_l \cos\left[l\left(k+\frac{1}{2}\right) \frac{2\pi}{2N-1}\right],$$

$$k, l = 0, 1, \ldots, N-1$$

$$(C_N^{VIII})_{lk} = \frac{2}{\sqrt{2N+1}} \cos\left[\left(l+\frac{1}{2}\right)\left(k+\frac{1}{2}\right) \frac{2\pi}{2N+1}\right],$$

$$k, l = 0, 1, \ldots, N-1$$

where $$\gamma_l = \frac{1}{\sqrt{2}} \text{ for } l = 0 \text{ or } N-1,$$

$$\sigma_l = \frac{1}{\sqrt{2}} \text{ for } l = 0,$$

and $$\varepsilon_l = \frac{1}{\sqrt{2}} \text{ for } l = N-1$$

Here, $\gamma_l$, $\sigma_l$, $\varepsilon_l$ have a value of 1 except for the above values. That is, it has a value of 1 as a default.

Also, an equation for the sine transform applied in the present disclosure is as shown in Equation 27 below.

$$(S_N^I)_{lk} = \sqrt{\frac{2}{N-1}} \sin\left[(l+1)(k+1)\frac{\pi}{N+1}\right], \quad \text{[Equation 27]}$$

$$k, l = 0, 1, \ldots, N-1$$

$$(S_N^{II})_{lk} = \sqrt{\frac{2}{N}} \varepsilon_k \sin\left[\left(l+\frac{1}{2}\right)(k+1)\frac{\pi}{N}\right],$$

$$k, l = 0, 1, \ldots, N-1$$

$$(S_N^{III})_{lk} = \sqrt{\frac{2}{N}} \varepsilon_l \sin\left[(l+1)\left(k+\frac{1}{2}\right)\frac{\pi}{N}\right],$$

$$k, l = 0, 1, \ldots, N-1$$

$$(S_N^{IV})_{lk} = \sqrt{\frac{2}{N}} \sin\left[\left(l+\frac{1}{2}\right)\left(k+\frac{1}{2}\right)\frac{\pi}{N}\right],$$

$$k, l = 0, 1, \ldots, N-1$$

$$(S_N^{V})_{lk} = \frac{2}{\sqrt{2N+1}} \sin\left[(l+1)(k+1)\frac{2\pi}{2N+1}\right],$$

$$k, l = 0, 1, \ldots, N-1$$

$$(S_N^{VI})_{lk} = \frac{2}{\sqrt{2N+1}} \sin\left[\left(l+\frac{1}{2}\right)(k+1)\frac{2\pi}{2N+1}\right],$$

$$k, l = 0, 1, \ldots, N-1$$

$$(S_N^{VII})_{lk} = \frac{2}{\sqrt{2N+1}} \sin\left[(l+1)\left(k+\frac{1}{2}\right)\frac{2\pi}{2N+1}\right],$$

$$k, l = 0, 1, \ldots, N-1$$

$$(S_N^{VIII})_{lk} = \frac{2}{\sqrt{2N-1}} \varepsilon_l \varepsilon_k \sin\left[\left(l+\frac{1}{2}\right)\left(k+\frac{1}{2}\right)\frac{2\pi}{2N-1}\right],$$

$$k, l = 0, 1, \ldots, N-1$$

where $$\varepsilon_l = \frac{1}{\sqrt{2}} \text{ for } l = N-1$$

Here, $\varepsilon_k$, $\varepsilon_l$ have a value of 1 except for the above values. That is, it has a value of 1 as a default.

Relational expressions of Equation 28 below including the relation between $C_N^{VIII}$ and $S_N^{VII}$ and the relation between $C_N^{IV}$ and $S_N^{VI}$ described above may be derived from the equations for the cosine transforms and the sine transforms.

$$\begin{aligned}
C_N^{II} &= D_N S_N^{II} J_N & (C_N^{II})^T &= J_N (S_N^{II})^T D_N \\
C_N^{III} &= J_N S_N^{III} D_N & (C_N^{III})^T &= D_N (S_N^{III})^T J_N \\
C_N^{IV} &= J_N S_N^{IV} D_N & (C_N^{IV})^T &= D_N (S_N^{IV})^T J_N \\
C_N^{V} &= J_N C_N^{VI} D_N & (C_N^{V})^T &= D_N (C_N^{VI})^T J_N \\
C_N^{V} &= D_N C_N^{VII} J_N & (C_N^{V})^T &= J_N (C_N^{VII})^T D_N \\
C_N^{VI} &= J_N C_N^{V} D_N & (C_N^{VI})^T &= D_N (C_N^{V})^T J_N \\
C_N^{VI} &= D_N S_N^{VIII} J_N & (C_N^{VI})^T &= J_N (S_N^{VIII})^T D_N \\
C_N^{VII} &= D_N C_N^{V} J_N & (C_N^{VII})^T &= J_N (C_N^{V})^T D_N \\
C_N^{VII} &= J_N S_N^{VII} D_N & (C_N^{VII})^T &= D_N (S_N^{VII})^T J_N \\
C_N^{VIII} &= J_N S_N^{VII} D_N & (C_N^{VIII})^T &= D_N (S_N^{VII})^T J_N \\
V_N^{VIII} &= D_N S_N^{VI} J_N & (C_N^{VIII})^T &= J_N (S_N^{VI})^T D_N \\
S_N^{II} &= D_N C_N^{II} J_N & (S_N^{II})^T &= J_N (C_N^{II})^T D_N \\
S_N^{III} &= J_N C_N^{III} D_N & (S_N^{III})^T &= D_N (C_N^{III})^T J_N \\
S_N^{IV} &= J_N C_N^{IV} D_N & (S_N^{IV})^T &= D_N (C_N^{IV})^T J_N \\
S_N^{V} &= J_N S_N^{VI} D_N & (S_N^{V})^T &= D_N (S_N^{VI})^T J_N \\
S_N^{V} &= D_N S_N^{VII} J_N & (S_N^{V})^T &= J_N (S_N^{VII})^T D_N \\
S_N^{VI} &= J_N S_N^{V} D_N & (S_N^{VI})^T &= D_N (S_N^{V})^T J_N \\
S_N^{VI} &= D_N C_N^{VIII} J_N & (S_N^{VI})^T &= J_N (C_N^{VIII})^T D_N \\
S_N^{VII} &= D_N S_N^{V} J_N & (S_N^{VII})^T &= J_N (S_N^{V})^T D_N \\
S_N^{VII} &= J_N C_N^{VIII} D_N & (S_N^{VII})^T &= D_N (C_N^{VIII})^T J_N \\
S_N^{VIII} &= D_N C_N^{VI} J_N & (S_N^{VIII})^T &= J_N (C_N^{VI})^T D_N \\
S_N^{VIII} &= J_N C_N^{VII} D_N & (S_N^{VIII})^T &= D_N (C_N^{VII})^T J_N
\end{aligned} \quad \text{[Equation 28]}$$

In addition, relational expressions as shown in Equation 29 below may be derived from the relational expressions in Equation 28.

$$\begin{aligned}
C_N^{V} &= J_N D_N S_N^{VIII} J_N D_N & (C_N^{V})^T &= D_N J_N (S_N^{VIII})^T D_N J_N \\
C_N^{VI} &= J_N D_N C_N^{VII} J_N D_N & (C_N^{VI})^T &= D_N J_N (C_N^{VII})^T D_N J_N \\
C_N^{VII} &= D_N J_N C_N^{VI} D_N J_N & (C_N^{VII})^T &= J_N D_N (C_N^{VI})^T J_N D_N \\
C_N^{VIII} &= D_N J_N S_N^{V} D_N J_N & (C_N^{VIII})^T &= J_N D_N (S_N^{V})^T J_N D_N \\
S_N^{V} &= J_N D_N C_N^{VIII} J_N D_N & (S_N^{V})^T &= D_N J_N (C_N^{VIII})^T D_N J_N \\
S_N^{VI} &= J_N D_N S_N^{VII} J_N D_N & (S_N^{VI})^T &= D_N J_N (S_N^{VII})^T D_N J_N \\
S_N^{VII} &= D_N J_N S_N^{VI} D_N J_N & (S_N^{VII})^T &= J_N D_N (S_N^{VI})^T J_N D_N \\
S_N^{VIII} &= D_N J_N C_N^{V} D_N J_N & (S_N^{VIII})^T &= J_N D_N (C_N^{V})^T J_N D_N
\end{aligned} \quad \text{[Equation 29]}$$

The calculation for $D_N J_N$ and $J_N D_N$ in Equation 29 may be performed by appropriately combining the patterns of order inversion and sign inversion for input as shown in Equation 30 below.

$$D_N J_N x = [(-1)^0 x_{N-1} \; (-1)^1 x_{N=2} \; \ldots \; (-1)^{N-1} x_0]^T$$

$$J_N D_N x = [(-1)^{N-1} x_{N-1} \; (-1)^{N-2} x_{N=2} \; \ldots \; (-1)^0 x_0]^T \quad \text{[Equation 30]}$$

Accordingly, various other transforms may be derived with only the kernel coefficient data for one specific transform from the relational expressions in Equations 28 and 29 above. Equation 31 below expresses a set of transforms that one transform may span.

$$\text{Span}(C^I) = \{C^I\}$$
$$\text{Span}(C^{II}) = \{C^{II}, S^{II}\}$$
$$\text{Span}(C^{III}) = \{C^{III}, S^{III}\}$$
$$\text{Span}(C^{IV}) = \{C^{IV}, S^{IV}\}$$
$$\text{Span}(C^V) = \{C^V, C^{VI}, C^{VII}, S^{VIII}\}$$
$$\text{Span}(C^{VI}) = \{C^V, C^{VI}, C^{VII}, S^{VIII}\}$$
$$\text{Span}(C^{VII}) = \{C^V, C^{VI}, C^{VII}, S^{VIII}\}$$
$$\text{Span}(C^{VIII}) = \{C^{VIII}, S^V, S^{VI}, S^{VII}\}$$
$$\text{Span}(S^I) = \{S^I\}$$
$$\text{Span}(S^{II}) = \{C^{II}, S^{II}\}$$
$$\text{Span}(S^{III}) = \{C^{III}, S^{III}\}$$
$$\text{Span}(S^{IV}) = \{C^{IV}, S^{IV}\}$$
$$\text{Span}(S^V) = \{C^{VIII}, S^V, S^{VI}, S^{VII}\}$$
$$\text{Span}(S^{VI}) = \{C^{VIII}, S^V, S^{VI}, S^{VII}\}$$
$$\text{Span}(S^{VII}) = \{C^{VIII}, S^V, S^{VI}, S^{VII}\}$$
$$\text{Span}(S^{VIII}) = \{C^V, C^{VI}, C^{VII}, S^{VIII}\} \quad \text{[Equation 31]}$$

For each span set presented in Equation 31, a corresponding power set may be calculated. For example, a power set $P(\text{Span}(C^V))$ for $\text{Span}(C^V)$ may be expressed by Equation 32 below.

$$P(\text{Span}(C^V)) = \{\phi, \{C^V\}, \{C^{VI}\}, \{C^{VII}\}, \{S^{VIII}\}, \{C^V, C^{VI}\},$$
$$\{C^V, C^{VII}\}, \{C^V, S^{VIII}\}, \{C^{VI}, C^{VII}\}, \{C^{VI}, S^{VIII}\},$$
$$\{C^V, C^{VI}, C^{VII}\}, \{C^V, C^{VI}, S^{VIII}\}, \{C^V, C^{VII}, S^{VIII}\},$$
$$\{C^{VI}, C^{VII}, S^{VIII}\}, \{C^V, C^{VI}, C^{VII}, S^{VIII}\}\} \quad \text{[Equation 32]}$$

If an element of a power set for a span set called A is denoted as $e(A) \in P(\text{Span}(A))$, it may be expressed by Equation 33 below.

$$\Gamma = \bigcup_{i=I}^{VIII} e(C^i) \cup \bigcup_{j=I}^{VIII} e(S^j), \Gamma = \phi \quad \text{[Equation 33]}$$

The above-described transform set may be configured as shown in Equation 33 above. Since overlapping elements exist between the power sets of the span sets in Equation 31, $e(\cdot)$ appearing in Equation 33 may not be disjointed.

As in Equation 31 above, since one transform may be spanned into multiple transforms, the number of transforms that must be stored in the form of coefficient data in an actual memory space may be much smaller. For example, in order to span $\Gamma = \{C^V, C^{VI}, C^{VII}, C^{VIII}, S^V, S^{VI}, S^{VII}, S^{VIII}\}$, two transforms are sufficient, and $\{C^{VI}, S^{VII}\}$ may be used as one of several combinations.

Most codec systems include $C^H$ and it is known that $S^{VII}$ is generally efficient for residual data generated from intra prediction, and a maximum transform set which may be spanned from transforms as seeds may be generated as shown in Table 9 if $S^{VII}$ can be replaced with $S^{IV}$ as in Embodiment (2).

Since the maximally spanned set presented in Table 9 is a set of transforms that may be used at the maximum, a subset of Table 9 may be used when used as a transform set $\Gamma$.

From the relational expressions in Equations 28 and 29, a span set for $S^{VII}$ and $(S^{VII})^T$ may be expressed with $J_N$ and $D_N$ as shown in Equation 34 below.

$$\text{Span}(S^{VII}) = \{C^{VIII}, S^V, S^{VI}, S^{VII}\} \quad \text{[Equation 34]}$$
$$= \{J_N S_N^{VII} D_N, D_N S_N^{VII} J_N,$$
$$J_N D_N S_N^{VII} J_N D_N, S_N^{VII}\}$$

$$\text{Span}((S^{VII})^T) = \{D_N (S_N^{VII})^T J_N, J_N (S_N^{VII})^T D_N,$$
$$D_N J_N (S_N^{VII})^T D_N J_N, (S_N^{VII})^T\}$$

As described above, $S^{VII,R} = J_N S_N^{VII}$ may be used instead of $C^{VIII}$, and this brings about the effect of using a sign of a coefficient generated when the forward transform (e.g., $(S_N^{VII})^T$) is applied, without inverting it. When the same method is applied to Equation 34, $D_N$ multiplied to the front of the forward transform is eliminated and thus the corresponding span set is changed as shown in Equation 35 below.

$$\text{Span}((S^{VII})^T) = \{(S_N^{VII})^T J_N, J_N (S_N^{VII})^T D_N, J_N (S_N^{VII})$$
$$^T D_N J_N, (S_N^{VII})^T\}$$

$$\text{Span}(S^{VII}) = \{J_N S_N^{VII}, D_N S_N^{VII} J_N, J_N D_N S_N^{VII} J_N, S_N^{VII}\} \quad \text{[Equation 35]}$$

Accordingly, even in the span sets listed in Equation 31 and Table 9, all the transforms included in each span set may be expressed as linear relational expression of $J_N$ and $D_N$ and seed transform as shown in Equation 34 using the relational expressions in Equations 28 and 29. Thereafter, a forward transform as shown in Equation 35 is calculated, and when the leading $D_N$ is removed, span sets including transforms that do not invert the sign of transform coefficients may be derived. A desired transform set $\Gamma$ may be configured based on the relational expression of Equation 33 above using the acquired span sets.

Referring to Equation 34, it can be seen that the transforms are spanned by appropriately multiplying $J_N$ and $D_N$ back and forth with the seed transform $S_N^{VII}$ as the center. The matrices multiplied to the front may be considered as post-processing an output obtained after applying the center seed transform. Also, the matrices multiplied to the rear may be seen as pre-processing an input before applying the central seed transform. A result of multiplying $J_N$ and $D_N$ several times in various combinations may be summarized as in Equation 36 below.

$$cAB, \text{ where } c = +1 \text{ or } -1, A = I(\text{identity matrix}) \text{ or } D_N,$$
$$\text{and } B = I \text{ or } J_N \quad \text{[Equation 36]}$$

Therefore, 8 cases are available for each of the pre-processing and the post-processing for one seed transform, and 64 cases are generated as a combination of the two. However, when a value c on the pre-processing side and a value c on the post-processing side are considered together, overlapping cases occur (that is, the sign change finally results in two types of +/−), so the number of cases totals 32.

If only the sign change pattern of the transform result is considered and the sign value itself is ignored, the value c in Equation 36 may be fixed to 1, and thus the number of cases totals 16. Equation 37 below is an example obtained by applying Equation 36 to both pre-processing and post-processing.

$$\text{Span}(S_N^{VII}) = \{S_N^{VII}, -S_N^{VII}, S_N^{VII}J_N, -S_N^{VII}J_N, S_N^{VII}D_N, \quad [\text{Equation 37}]$$
$$-S_N^{VII}D_N, S_N^{VII}D_NJ_N, -S_N^{VII}D_NJ_N, J_NS_N^{VII}, -J_NS_N^{VII},$$
$$J_NS_N^{VII}J_N, -J_NS_N^{VII}J_N, J_NS_N^{VII}D_N, -J_NS_N^{VK}D_N,$$
$$J_NS_N^{VII}D_NJ_N, -J_NS_N^{VII}D_NJ_N, D_NS_N^{VII}, -D_NS_N^{VI},$$
$$D_NS_N^{VII}J_N, -D_NS_N^{VII}J_N, D_NS_N^{VII}D_N, -D_NS_N^{VII}D_N,$$
$$D_NS_N^{VII}D_NJ_N, -D_NS_N^{VII}D_NJ_N, D_NJ_NS_N^{VII}, -D_NJ_NS_N^{VII},$$
$$D_NJ_NS_N^{VI}J_N, -D_NJ_NS_N^{VII}J_N, D_NJ_NS_N^{VII}D_N,$$
$$-D_NJ_NS_N^{VII}D_N, D_NJ_NS_N^{VII}D_NJ_N, -D_NJ_NS_N^{VII}D_NJ_N\}$$

Equation 38 below is an example of a case where the value c is not considered for the example of Equation 37.

$$\text{Span}(S_N^{VII}) = \{S_N^{VII}S_N^{VII}J_N, S_N^{VII}D_N, S_N^{VII}D_NJ_N, J_NS_N^{VII}, \quad [\text{Equation 38}]$$
$$J_NS_N^{VII}J_N, J_NS_N^{VII}D_N, J_NS_N^{VII}D_NJ_N, D_NS_N^{VII},$$
$$D_NS_N^{VII}J_N, D_NS_N^{VII}D_N, D_NS_N^{VII}D_NJ_N, D_NJ_NS_N^{VII},$$
$$D_NJ_NS_N^{VII}J_N, D_NJ_NS_N^{VII}D_N, D_NJ_NS_N^{VII}D_NJ_N\}$$

If the sign of the transform coefficients obtained by applying the forward transform is not concerned as in Equation 35, the combination of $J_N$ and $D_N$ may be used as it is in the input pre-processing side for the forward transform and only $J_N$ may be used on the output post-processing side, and thus, the total number of cases is reduced to eight. The Equation 39 below shows a corresponding example.

$$\text{Span}((S_N^{VII})^T) = \{(S_N^{VII})^T, (S_N^{VII})^TJ_N, (S_N^{VII})^TD_N,$$
$$(S_N^{VII})^TD_NJ_N, \quad J_N(S_N^{VII})^T, J_N(S_N^{VII})^TJ_N, J_N$$
$$(S_N^{VII})^TD_N, J_N(S_N^{VII})^TD_NJ_N\}$$

$$\text{Span}(S^{VII}) = \{S_N^{VII}, J_NS_N^{VII}, D_NS_N^{VII}, J_ND_NS_N^{VII}S_N^{VII}J_N,$$
$$J_NS_N^{VII}J_N, D_NS_N^{VII}J_N, J_ND_NS_N^{VII}J_N\} \quad [\text{Equation 35}]$$

In the present disclosure, a span set as in Equation 39 above may be induced for all cosine transforms/sine transforms. As shown in Equation 32, each corresponding power set may be configured, and a transform set Γ to be used for determining a transform set may be configured through Equation 33 above.

The method of adding the input pre-processing step and the output post-processing to the above-described one transform in various forms is not applicable only to trigonometric transforms as in Equations 37 to 39 but applicable to other transforms (e.g., KLT, SOT, etc.), and thus, a corresponding span set may be derived.

In addition, in Equations 36 to 39, the matrices corresponding to the pre-processing and post-processing are configured only by the combination of $J_N$ and $D_N$, but the matrices may also be configured through any type of calculation with other matrices than $J_N$ and $D_N$.

The set of horizontal/vertical transform kernels (Γ) described above may be configured in various combinations in consideration of transform efficiency and may further include an identity transform (kernel). The identity transform (kernel) may be denoted by I. For example, the identity transform I may be further included in the set Γ of Equations 19 to 25 described above. In addition, Γ derived from Equation 33 described above may be configured by further adding I as shown in Equation 40 below.

$$\Gamma = \bigcup_{i=1}^{VIII} e(C^i) \cup \bigcup_{j=1}^{VIII} e(S^j) \cup \{I\}, \Gamma = \phi \quad [\text{Equation 40}]$$

Applying the identity transform may be equivalent to bypassing the input value by the output value, which may have the same effect of not applying the transform for the corresponding direction, that is, skipping the transform. According to the related art method, in the case of applying separable transform, it may be possible to not apply the transform to both the horizontal and vertical directions through separate flag information, but it is not possible to apply the transform only to part of the horizontal/vertical directions and skip transform on the remaining part. According to the present disclosure, by configuring the identity transform in the transform set, transform may be applied only to part of the vertical/horizontal directions and transform may be skipped at the other remaining part. This may be referred to as partial transform skip. For example, applying DCT-type 2 in the horizontal direction and identity transform in the vertical direction may be equivalent to applying DCT-type 2 only in the horizontal direction.

It is natural that the above-described transform configuration group may be configured to include the identity transform.

Meanwhile, according to the present disclosure, the (transform coefficient) scan order may be determined according to whether separable transform is applied or the identity transform is applied, that is, according to whether transform skip is applied. The encoding apparatus may perform residual coding on the quantized transform coefficients in the 2D block according to the scan order and derive residual information. The decoding apparatus may derive a 2D block including the transform coefficients from residual information included in a bitstream based on the scan order. In this case, even when one coding unit or transform unit is divided into coefficient groups (in CGs) which is 4×4 blocks and internal coefficients are scanned for CGs, the scan order may be followed. Alternatively, a scanning pattern may be collectively applied without dividing the coding unit or transform unit into CGs or the coding unit or the transform unit may be divided into CGs larger or smaller than 4×4 blocks, and then the similar method described above may be applied. For example, the scan order may include, for example, a top-right diagonal scan order, a horizontal scan order, and a vertical scan order. Non-zero effective coefficient position information, position information of coefficients greater than 1 in a reverse scan direction from the non-zero effective coefficient position, position information of coefficients greater than 2, coefficient size information, and the like may be derived from the non-zero effective coefficient position according to the scan order.

For example, when the identity transform (skip transform) is applied in one direction (vertical or horizontal direction) and a non-trivial transform such as the cosine/sine transform described above is applied in the other direction, a separate scan order may be derived based thereon.

Figure 5:
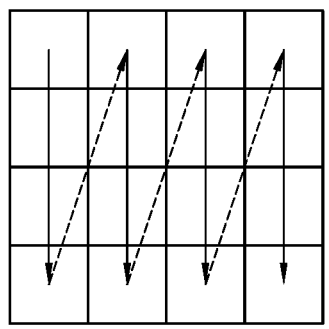
FIG. 5 shows an example of a transform coefficient scan order according to the present disclosure.
Figure 5:
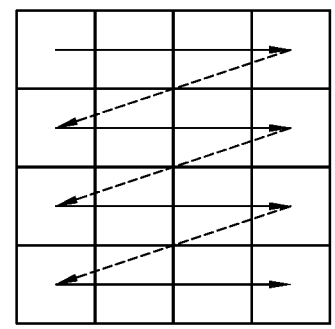

FIG. 5 shows an example of a transform coefficient scan order according to the present disclosure.

Referring to FIG. 5, (a) shows a vertical scan order, and (b) shows a horizontal scan order. In the above example, when the cosine/sine transform such as DCT type 2, DST type 7, or DCT type 8 is applied in the horizontal direction and the identity transform (transform skip) is applied in the vertical direction, the scan order for the corresponding block may be determined as the vertical scan order. Alternatively, when the cosine/sine transform such as DCT type 2, DST type 7, or DCT type 8 is applied in the vertical direction and the identity transform (skip transform) is applied in the horizontal direction, the scan order for the corresponding block may be determined as the horizontal scan order.

In addition, when the identity matrix I is included in the transform set (transform kernel set) as described above, the transform configuration groups of Tables 3 to 7 described above may include the identity matrix, and in a state where such a mapping table is determined, a corresponding transform set may be applied as designated in the mapping table in consideration of image coding characteristics (e.g., prediction mode, block size/shape), and the like.

In addition, the following information may be signaled in the present disclosure described above.

Whether the above-described partial transform skip is applied may be signaled through a higher-level syntax element such as a sequence parameter set (SPS) or a picture parameter set (PPS). For example, the syntax element may be termed as a transform skip enabled flag or partial_transform_skip_enabled_flag. The mapping table or a transform set to which the proposed partial transform skip is applied may be limitedly used only when the corresponding syntax value is 1. The mapping table may refer to a separate mapping table to which partial transform skip is applied (i.e., a mapping table including an identity transform). The transform set refers to different combinations corresponding to the same index value and may be configured to apply, for example, (DST7, I), rather than (DST 7, DST1), as a transform set for index 1 of Group 1 in Table 3 described above.

In addition, according to the present disclosure, whether the transform skip scheme is applied may be signaled at a lower level such as CTU, CU, PU, TU. The mapping table or the transform set to which the proposed partial transform skip is applied may be limitedly used only for a case where the corresponding syntax value is 1, and in this case, a mapping table or a transform set including the identity transform may be determined.

The separable transform may be configured to designate whether to apply the transform skip by providing 1-bit flag (i.e., horizontal transform skip flag and vertical transform skip flag) for each direction (horizontal, vertical). If (horizontal or vertical) transform skip is applied only to one direction designated for each transform set, the flag may be provided only for the corresponding direction and whether to permit the transform skip for a certain direction may be set to be different for each transform configuration group and transform set.

As described above, when 1-bit flag is provided for each direction (horizontal, vertical), it may be configured to conditionally code the flag. For example, it may be configured not to code the flag (e.g., vertical transform skip flag) for the vertical direction if the corresponding value is 1 in case where a flag for a horizontal direction (e.g., a horizontal transform skip flag) is first coded. As another example, it may be configured not to code the flag (e.g., horizontal transform skip flag) for the horizontal direction if the corresponding value is 1 in case where a flag for a vertical direction (e.g., a vertical transform skip flag) is first coded.

In addition, whether to code the flag for the horizontal direction first or the flag for the vertical direction first may be set to be different for each transform configuration group and each transform set.

FIG. 6 schematically shows an example of a video/image encoding method including a transform method and an apparatus thereof according to the present disclosure. The method disclosed in FIG. 6 may be performed by the encoding apparatus disclosed in FIG. 1.

Specifically, for example, step S600 of FIG. 6 may be performed by the subtractor 121 of the encoding apparatus, and steps S610 to S630 may be performed by the transformer 122 of the encoding apparatus.

Referring to FIG. 6, the encoding apparatus acquires residual samples for a target block (S600). The target block may be called a current block. The encoding apparatus may derive a predicted block including prediction samples for the target block through inter prediction or intra prediction for the target block. The encoding apparatus may obtain residual samples for the target block by comparing the predicted block with the original block for the target block.

The encoding apparatus derives a transform configuration group for separable transform (S610). The transform configuration group may include a plurality of vertical and horizontal transform kernel candidate sets. For example, the transform configuration group may include the contents disclosed in Tables 3 to 7 described above. Also, the transform configuration group may include an identity transform kernel as a transform (kernel) set candidate included therein.

The encoding apparatus selects one of the plurality of candidate sets and generates transform index information indicating the selected candidate set (S620). The encoding apparatus may select an optimal candidate set from among the plurality of candidate sets based on an RD cost and generate the transform index information indicating the selected candidate set. For example, the transform configuration group may include four vertical and horizontal transform kernel candidate sets, and the transform index may indicate one of the four candidate sets. Alternatively, for example, the transform configuration group may include k vertical and horizontal transform kernel candidate sets and the transform index may indicate one of the k candidate sets.

The encoding apparatus performs a separable transform based on the horizontal transform kernel and the vertical transform kernel included in the selected candidate set to derive transform coefficients (S630).

For example, when the horizontal transform kernel is derived as an identity transform kernel and the vertical transform kernel is derived as a cosine or sine transform kernel, transform may be skipped in the horizontal direction for the residual samples of the target block and transform may be applied based on the cosine or sine transform kernel in the vertical direction. In this case, the cosine or sine transform kernel may include DCT type 2, DST type 7, or DCT type 8.

As another example, when the vertical transform kernel is derived as the identity transform kernel and the horizontal transform kernel is derived as the cosine or sine transform kernel, the transform is skipped in the vertical direction for the residual samples of the target block and the transform may be applied based on the cosine or sine transform kernel in the horizontal direction. In this case, the cosine or sine transform kernel may include DCT type 2, DST type 7, or DCT type 8.

Transform coefficients for the target block may be acquired through the separable transform. The separable transform includes a procedure of transforming the residual samples in a spatial domain into transform coefficients in a frequency domain. Here, the target block may include a CU, a subblock in a CU, a TU, a transform block, and a transform coefficient block. Meanwhile, as described above in FIG. 3, when the secondary transform is further applied, the NSST may be further performed on the transform coefficients as described above.

The encoding apparatus may encode and output the transform coefficients according to a predetermined procedure. The encoding apparatus may perform residual coding on the transform coefficients and generate residual information according to a scan order. For example, when the horizontal transform kernel is derived as the identity transform kernel and the vertical transform kernel is derived as the cosine or sine transform kernel, the scan order for the target block may be determined as a horizontal scan order. As another example, when the vertical transform kernel is derived as the identity transform kernel and the horizontal transform kernel is derived as the cosine or sine transform kernel, the scan order for the target block may be determined as a vertical scan order.

The encoding apparatus may encode image information including the transform index information and the residual information and output the same in a bitstream form.

Meanwhile, the encoding apparatus may generate a transform skip enabled flag. In this case, the image information may further include the transform skip enabled flag. When a value of the transform skip enabled flag indicates 1, the transform configuration group may include the horizontal transform kernel or the identity transform kernel as the transform kernel candidate for the horizontal transform kernel or the vertical transform kernel. The transform skip enabled flag may be signaled at a sequence parameter set (SPS) or picture parameter set (PPS) level.

In addition, the encoding apparatus may generate a horizontal transform skip flag and a vertical transform skip flag. In this case, the image information may further include the horizontal transform skip flag and the vertical transform skip flag. When a value of the horizontal transform skip flag is 1, the transform configuration group may include the identity transform kernel as the transform kernel candidate for the horizontal transform kernel, and when the value of the vertical transform skip flag is 1, the transform configuration group may include the identity transform kernel as the transform kernel candidate for the vertical transform kernel. Further, as an example, the encoding apparatus may generate and encode the vertical transform skip flag only when the value of the horizontal transform skip flag is 0, and may not generate, or may not encode although it generates, the vertical transform skip flag when the value of the horizontal transform skip flag is 1. When the value of the horizontal transform skip flag is 1, the decoding apparatus may regard the vertical transform skip flag as 0, without parsing/decoding the vertical transform skip flag from a bitstream. As another example, the encoding apparatus may generate and encode the horizontal transform skip flag only when the value of the vertical transform skip flag is 0, and may not generate, or may not encode although it generates, the horizontal transform skip flag when the value of the vertical transform skip flag is 0. When the value of the vertical transform skip flag is 1, the decoding apparatus may regard the horizontal transform skip flag as 0, without parsing/decoding the horizontal transform skip flag from the bitstream.

The bitstream may be transmitted to the decoding apparatus through a network or storage medium.

Figure 7:
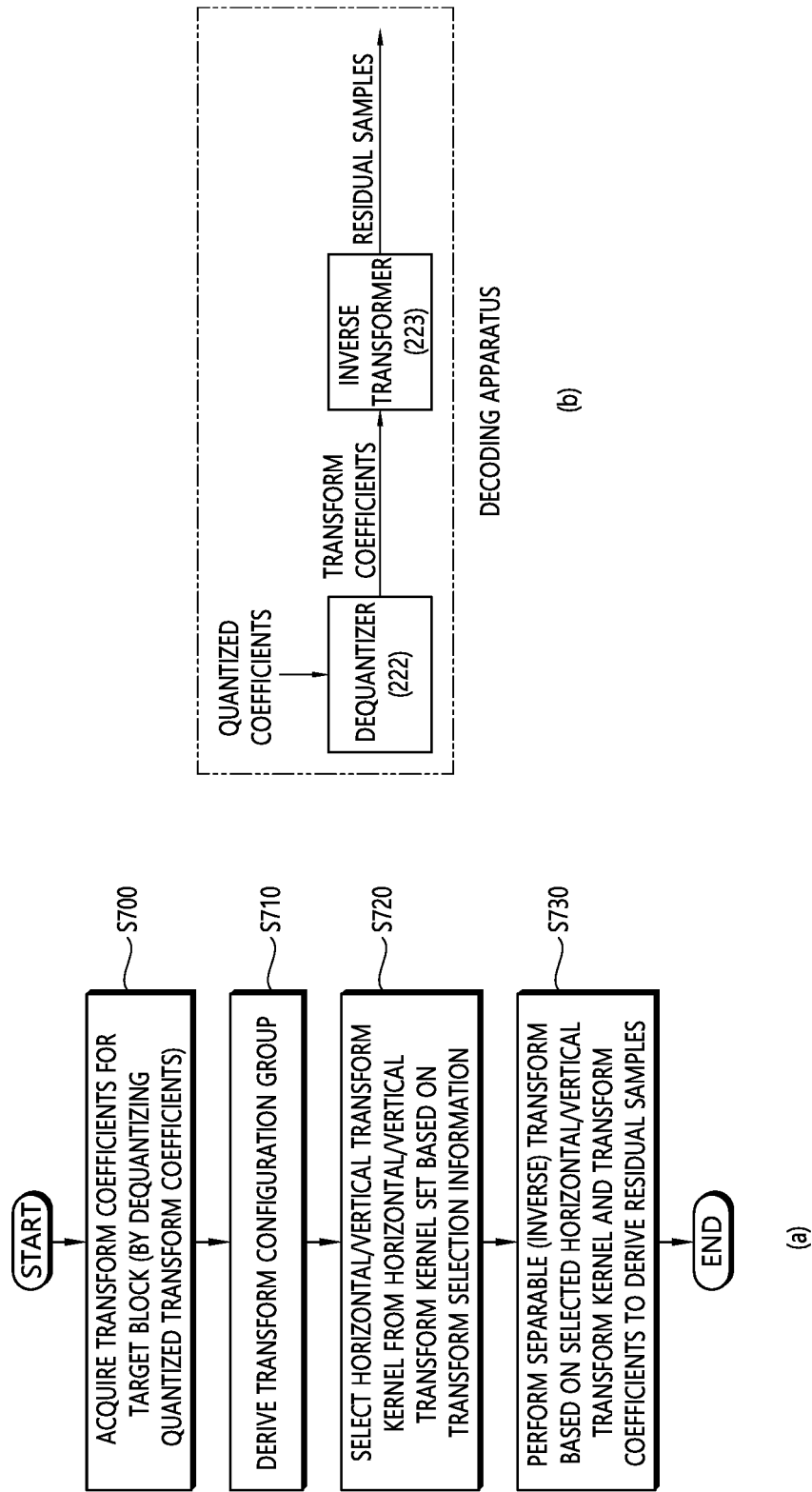
FIG. 7 schematically shows an example of a video/image decoding method including a transform method and an apparatus thereof according to the present disclosure.

FIG. 7 schematically shows an example of a video/image decoding method including a transform method and an apparatus thereof according to the present disclosure. The method disclosed in FIG. 7 may be performed by the decoding apparatus disclosed in FIG. 2. Specifically, for example, step S700 of FIG. 7 may be performed by the dequantizer 221 of the decoding apparatus, and steps S710 to S730 may be performed by the inverse transformer 222 of the decoding apparatus. Meanwhile, although the decoding apparatus is described, the method disclosed in FIG. 7 may be performed in the same manner in the dequantizer 125 and the inverse transformer 126 of the encoding apparatus.

Referring to FIG. 7, the decoding apparatus acquires transform coefficients for a target block (S700). The decoding apparatus may dequantize quantized transform coefficients for the target block acquired from residual information received through a bitstream to acquire transform coefficients. Here, the target block may include a CU, a subblock in a CU, a TU, a transform block, and a transform coefficient block.

The decoding apparatus derives a transform configuration group for separable transform (S710). The transform configuration group may include a plurality of vertical and horizontal transform kernel candidate sets. For example, the transform configuration group may include the contents disclosed in Tables 3 to 7 described above. Also, the transform configuration group may include an identity transform kernel as a transform (kernel) set candidate included therein.

The decoding apparatus selects one of the plurality of candidate sets based on the transform index information acquired from the bitstream and the transform configuration group and derive a horizontal transform kernel and a vertical transform kernel included in the selected candidate set (S720). For example, the transform configuration group ma include four vertical and horizontal transform kernel candidate sets, and the transform index may indicate one of the four candidate sets. Alternatively, for example, the transform configuration group may include k vertical and horizontal transform kernel candidate sets, and the transform index may indicate one of the k candidate sets.

The decoding apparatus performs a separable (inverse) transform based on the derived horizontal transform kernel and vertical transform kernel to derive residual samples (S730).

For example, when the horizontal transform kernel is derived as the identity transform kernel and the vertical transform kernel is derived as the cosine or sine transform kernel, transform may be skipped in the horizontal direction on the transform coefficients of the target block and transform may be applied based on the cosine or sine transform kernel in the vertical direction. In this case, the cosine or sine transform kernel may include DCT type 2, DST type 7, or DCT type 8.

In another example, when the vertical transform kernel is derived as the identity transform kernel and the horizontal transform kernel is derived as the cosine or sine transform kernel, transform may be skipped in the horizontal direction on the transform coefficients of the target block and transform may be applied based on the cosine or sine transform kernel in the vertical direction. In this case, the cosine or sine transform kernel may include DCT type 2, DST type 7, or DCT type 8.

The decoding apparatus may acquire a transform skip enabled flag from the bitstream. When a value of the transform skip enabled flag indicates 1, the transform configuration group may include the identity transform kernel as the transform kernel candidate for the horizontal transform kernel or the vertical transform kernel. The transform skip enabled flag may be signaled at a sequence parameter set (SPS) or picture parameter set (PPS) level.

In addition, the decoding apparatus may acquire a horizontal transform skip flag and a vertical transform skip flag from the bitstream. When the value of the horizontal transform skip flag is 1, the transform configuration group may include the identity transform kernel as the transform kernel candidate for the horizontal transform kernel, and when the value of the vertical transform skip flag is 1, the transform configuration group may include the identity transform kernel as the transform kernel candidate for the vertical transform kernel.

In addition, the decoding apparatus may acquire a horizontal transform skip flag from the bitstream, and when a value of the horizontal transform skip flag is 0, the decoding apparatus may further acquire a vertical transform skip flag from the bitstream. When the value of the horizontal transform skip flag is 1, a bit for the vertical transform skip flag may not exist in the bitstream. In this case, the decoding apparatus may regard the value of the vertical transform skip flag as 0.

In addition, the decoding apparatus may acquire a vertical transform skip flag from the bitstream, and when a value of the vertical transform skip flag is 0, the decoding apparatus may further acquire a horizontal transform skip flag from the bitstream. When the value of the vertical transform skip flag is 1, a bit for the horizontal transform skip flag may not exist in the bitstream. In this case, the decoding apparatus may regard the value of the horizontal transform skip flag as 0.

Through the separable (inverse) transform, residual samples for the target block may be acquired. The separable (inverse) transform includes a procedure of (inverse) transforming the transform coefficients of the frequency domain into residual samples of the spatial domain. Here, the target block may include a CU, a subblock in a CU, a TU, a transform block, and a transform coefficient block. Meanwhile, as described above in FIG. 3, when the secondary (inverse) transform is further applied, an input of the separable (inverse) transform may correspond to the (secondary) transform coefficients which are an output of the secondary (inverse) transform as described above.

The decoding apparatus may combine prediction samples acquired as an inter or intra prediction result with the residual samples to acquire reconstructed samples, and reconstruct a picture based on the reconstructed samples. Thereafter, the decoding apparatus may apply an in-loop filtering procedure such as deblocking filtering, SAO and/or ALF procedure to the reconstructed picture in order to improve subjective/objective image quality as needed, as described above.

Meanwhile, the overall video/image encoding and decoding methods including the transform method described above with reference to FIGS. 6 and 7 may be performed specifically as follows.

Figure 8:
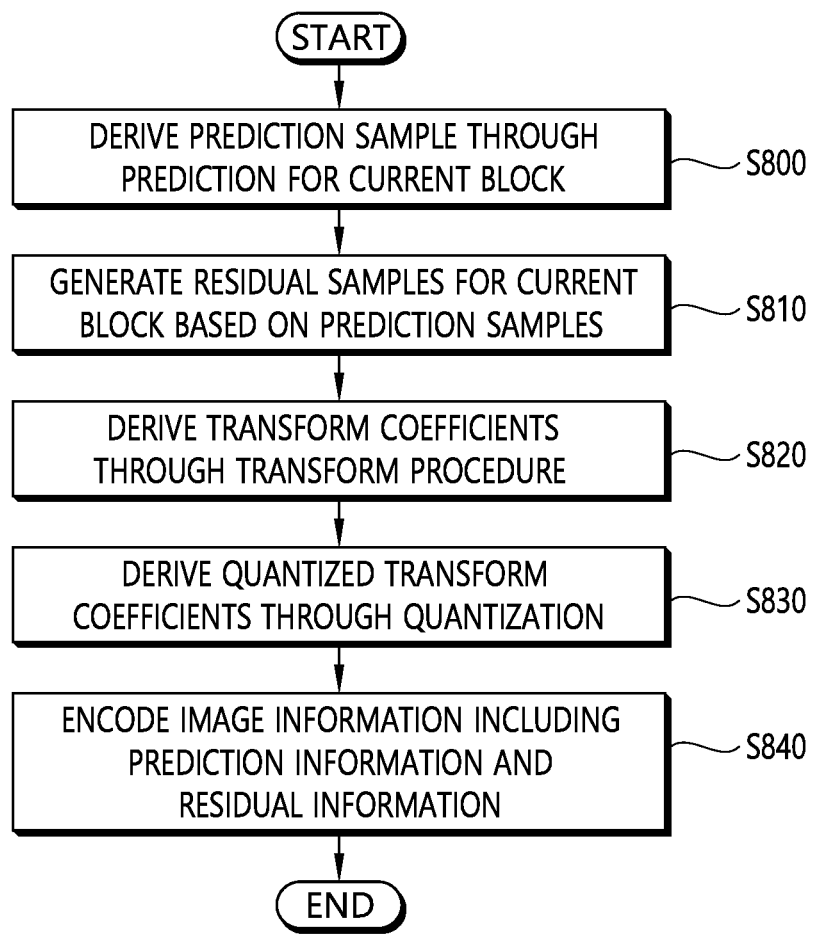
FIG. 8 schematically shows an example of a video/image encoding method according to the present disclosure.

FIG. 8 schematically shows an example of a video/image encoding method according to the present disclosure. The method disclosed in FIG. 8 may be performed by the encoding apparatus disclosed in FIG. 1. Specifically, for example, step S800 in FIG. 8 may be performed by the predictor of the encoding apparatus, step S810 may be performed by the subtractor of the encoding apparatus, step S820 may be performed by the transformer of the encoding apparatus, step S830 may be performed by the quantizer of the encoding apparatus, and step S940 may be performed by the entropy encoder of the encoding apparatus.

Step S600 described above in FIG. 6 may be included in step S810 of FIG. 8, and steps S610 to S630 may be included in step S820 of FIG. 8.

Referring to FIG. 8, the encoding apparatus may derive prediction samples through prediction for a current block (S800). The encoding apparatus may determine whether to perform inter prediction or intra prediction on the current block, and may determine a specific inter prediction mode or a specific intra prediction mode based on RD cost. The encoding apparatus may derive prediction samples for the current block according to the determined mode.

The encoding apparatus may derive residual samples by comparing the prediction samples with the original samples for the current block (S810).

The encoding apparatus may derive transform coefficients through a transform procedure on the residual samples (S820). In this case, the transform procedure may include the separable transform procedure described above in steps S610 to S630 of FIG. 6 and may include the non-separable secondary transform (NSST) procedure. As described above, the NSST may be omitted.

The encoding apparatus quantizes the derived transform coefficients to derive quantized transform coefficients (S830).

The encoding apparatus may encode image information including prediction information and residual information and output the encoded image information in the form of a bitstream (S840). The prediction information, as information related to the prediction procedure, may include prediction mode information and motion information (e.g., when inter prediction is applied). The residual information includes information on the size and position of the quantized transform coefficients. In addition, as described above, the image information may further include the transform index information, the transform skip enabled flag, the horizontal transform skip flag, and/or the vertical transform skip flag.

The output bitstream may be transferred to the decoding apparatus through a storage medium or a network.

FIG. 9 schematically shows an example of a video/image decoding method according to the present disclosure. The method disclosed in FIG. 9 may be performed by the decoding apparatus disclosed in FIG. 2. Specifically, for example, step S900 in FIG. 9 may be performed by the predictor of the decoding apparatus, step S910 may be performed by the entropy decoder of the decoding apparatus, step S920 may be performed by the dequantizer of the decoding apparatus, step S930 may be performed by the inverse transformer of the decoding apparatus, and step S940 may be performed by the adder of the decoding apparatus.

Step S700 described above in FIG. 7 may be included in step S920 of FIG. 9, and steps S710 to S730 may be included in step S930 of FIG. 9.

Referring to FIG. 9, the decoding apparatus may perform an operation corresponding to the operation performed by the encoding apparatus. The decoding apparatus may perform inter prediction or intra prediction on the current block based on the prediction information received through the bitstream and derive prediction samples (S900).

The decoding apparatus may derive quantized transform coefficients for the current block based on residual information received through the bitstream (S910).

The decoding apparatus may dequantize the quantized transform coefficients to derive transform coefficients (S920).

The decoding apparatus derives residual samples through an inverse transform procedure for the transform coefficients (S930). In this case, the inverse transform procedure may include the separable (inverse) transform procedure described above in steps S710 to S730 of FIG. 7 and may include the NSST procedure. As described above, the NSST may be omitted.

The decoding apparatus may generate reconstructed samples for the current block based on the prediction samples and the residual samples and may generate a reconstructed picture based on the reconstructed samples (S940). Thereafter, an in-loop filtering procedure such as deblocking filtering, SAO and/or ALF procedure may be applied to the reconstructed picture to improve subjective/objective image quality as needed.

The method according to the present disclosure described above may be implemented in software. The encoding device and/or decoding device according to the present disclosure may be included in a device that performs image processing, for example, for a TV, a computer, a smart phone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An image decoding method performed by a decoding apparatus, the image decoding method comprising:
   deriving quantized transform coefficients for a target block from a bit stream;
   deriving transform coefficients through dequantization based on the quantized transform coefficients for the target block;
   determining a transform configuration group for the target block;
   deriving a horizontal transform kernel and a vertical transform kernel based on transform index information acquired from the bit stream and the transform configuration group;
   deriving residual samples by performing a separable transform based on the horizontal transform kernel and the vertical transform kernel; and
   generating a reconstructed picture based on the residual samples and prediction samples for the target block,
   wherein a horizontal transform skip flag and a vertical transform skip flag are acquired from the bit stream,
   wherein the transform configuration group includes the identity transform kernel as the transform kernel candidate for the horizontal transform kernel when a value of the horizontal transform skip flag is 1, and
   wherein the transform configuration group includes the identity transform kernel as the transform kernel candidate for the vertical transform kernel when a value of the vertical transform skip flag is 1.

2. The image decoding method of claim 1, wherein when the horizontal transform kernel is derived as the identity transform kernel and the vertical transform kernel is derived as a cosine or sine transform kernel, transform is skipped in a horizontal direction for the transform coefficients of the target block and transform is applied based on the cosine or sine transform kernel in a vertical direction.

3. The image decoding method of claim 2, wherein the cosine or sine transform kernel is one of DCT type 2, DST type 7, or DCT type 8.

4. The image decoding method of claim 1, wherein when the horizontal transform kernel is derived as the identity transform kernel and the vertical transform kernel is derived as a cosine or sine transform kernel, a scan order for the target block is determined as a horizontal scan order and quantized transform coefficients for the target block are derived based on the horizontal scan order.

5. The image decoding method of claim 1, wherein when the vertical transform kernel is derived as the identity transform kernel and the horizontal transform kernel is derived as a cosine or sine transform kernel, transform is skipped in a vertical direction for the transform coefficients of the target block and transform is applied based on the cosine or sine transform kernel in a horizontal direction.

6. The image decoding method of claim 1, wherein when the vertical transform kernel is derived as the identity transform kernel and the horizontal transform kernel is derived as a cosine or sine transform kernel, a scan order for the target block is determined as a vertical scan order and quantized transform coefficients for the target block are derived based on the vertical scan order.

7. The image decoding method of claim 1, wherein the transform configuration group includes four vertical and horizontal transform kernel candidate sets, and the transform index indicates one of the four candidate sets.

8. An image decoding apparatus comprising:
   an entropy decoder configured to derive quantized transform coefficients for a target block from a bit stream;
   a dequantizer configured to derive transform coefficients through dequantization based on the quantized transform coefficients for the target block;
   an inverse-transformer configured to determine a transform configuration group for the target block, to derive a horizontal transform kernel and a vertical transform kernel based on transform index information acquired from the bit stream and the transform configuration group, and to derive residual samples by performing a separable transform based on the horizontal transform kernel and the vertical transform kernel; and
   an adder configured to generate a reconstructed picture based on the residual samples and prediction samples for the target block,
   wherein a horizontal transform skip flag and a vertical transform skip flag are acquired from the bit stream,
   wherein the transform configuration group includes the identity transform kernel as the transform kernel candidate for the horizontal transform kernel when a value of the horizontal transform skip flag is 1, and
   wherein the transform configuration group includes the identity transform kernel as the transform kernel candidate for the vertical transform kernel when a value of the vertical transform skip flag is 1.

9. An image encoding method performed by an encoding apparatus, the image encoding method comprising:
   deriving residual samples for a target block;
   determining a transform configuration group for the target block, the transform configuration group including a plurality of vertical and horizontal transform kernel candidate sets;

selecting one of the plurality of candidate sets and generating transform index information indicating the selected candidate set;

deriving transform coefficients by performing a separable transform based on a horizontal transform kernel and a vertical transform kernel included in the selected candidate set;

performing quantization based on the transform coefficients to derive quantized transform coefficients;

generating residual information based on the quantized transform coefficients; and encoding image information including the transform index information and the residual information, wherein the image information includes a horizontal transform skip flag and a vertical transform skip flag, wherein the transform configuration group includes the identity transform kernel as the transform kernel candidate for the horizontal transform kernel when a value of the horizontal transform skip flag is 1, and wherein the transform configuration group includes the identity transform kernel as the transform kernel candidate for the vertical transform kernel when a value of the vertical transform skip flag is 1.

10. The image encoding method of claim 9, wherein when the horizontal transform kernel is derived as the identity transform kernel and the vertical transform kernel is derived as a cosine or sine transform kernel, transform is skipped in a horizontal direction for the residual samples of the target block and transform is applied based on the cosine or sine transform kernel in a vertical direction.

11. The image encoding method of claim 9, wherein when the horizontal transform kernel is derived as the identity transform kernel and the vertical transform kernel is derived as a cosine or sine transform kernel, a scan order for the target block is determined as a horizontal scan order and quantized transform coefficients for the target block are derived based on the horizontal scan order.

12. The image encoding method of claim 9, wherein when the vertical transform kernel is derived as the identity transform kernel and the horizontal transform kernel is derived as a cosine or sine transform kernel, transform is skipped in a vertical direction for the transform coefficients of the target block and transform is applied based on the cosine or sine transform kernel in a horizontal direction.

13. The image encoding method of claim 9, wherein when the vertical transform kernel is derived as the identity transform kernel and the horizontal transform kernel is derived as a cosine or sine transform kernel, a scan order for the target block is determined as a vertical scan order and quantized transform coefficients for the target block are derived based on the vertical scan order.

* * * * *